United States Patent
Levine et al.

(10) Patent No.: US 10,270,818 B1
(45) Date of Patent: Apr. 23, 2019

(54) INLINE RESHARING

(71) Applicant: Google Inc., Mountain View, CA (US)

(72) Inventors: Matthew Levine, San Francisco, CA (US); Brynn Marie Evans, San Francisco, CA (US); Irene Chung, Mountain View, CA (US); Rodrigo Lagos, San Francisco, CA (US); Sophi Newman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 692 days.

(21) Appl. No.: 14/535,201

(22) Filed: Nov. 6, 2014

Related U.S. Application Data

(60) Provisional application No. 61/902,084, filed on Nov. 8, 2013.

(51) Int. Cl.
| | | |
|---|---|---|
| *G06F 3/00* | (2006.01) | |
| *G06F 9/00* | (2006.01) | |
| *G06F 17/00* | (2006.01) | |
| *H04L 29/06* | (2006.01) | |
| *G06F 3/0485* | (2013.01) | |
| *G06F 3/0484* | (2013.01) | |
| *H04L 12/58* | (2006.01) | |

(52) U.S. Cl.
CPC .......... *H04L 65/403* (2013.01); *G06F 3/0485* (2013.01); *G06F 3/04842* (2013.01); *H04L 51/32* (2013.01)

(58) Field of Classification Search
CPC .. G06F 3/04846; G06F 3/0485; G06F 9/4443; G06F 8/34; G06F 3/0486; G06F 8/38; G06F 3/0481; G06F 3/0482; G06F 3/04812; G06F 3/04847; G06F 3/04842; G06Q 10/10; H04L 65/403; H04L 51/32; H04N 1/00183; H04N 1/00185; H04N 1/00389; H04N 1/00411
See application file for complete search history.

(56) References Cited

U.S. PATENT DOCUMENTS

| | | | | |
|---|---|---|---|---|
| 7,761,507 | B2 * | 7/2010 | Herf ................... | H04L 12/1822 709/204 |
| 8,799,820 | B2 * | 8/2014 | Pascal ................ | G06F 3/04847 375/240 |
| 2002/0138582 | A1 * | 9/2002 | Chandra ............. | G06Q 10/107 709/206 |
| 2007/0082707 | A1 * | 4/2007 | Flynt .................... | G06F 3/0481 455/564 |
| 2007/0285439 | A1 * | 12/2007 | King ..................... | G09G 5/397 345/638 |
| 2009/0187470 | A1 * | 7/2009 | Smadja ................ | G06Q 30/02 705/14.44 |

(Continued)

*Primary Examiner* — Kieu D Vu
*Assistant Examiner* — Anita D. Chaudhuri
(74) *Attorney, Agent, or Firm* — Patent Law Works LLP

(57) ABSTRACT

A system for generating and providing an inline resharing interface and sharing content includes a processor and a memory storing instructions that, when executed, cause the system to provide items of content for presentation; receive input identifying a selected item from the items of content; generate an inline sharing interface corresponding to the selected item, the inline sharing interface including a portion of original content from the selected item, an comment area, and an addressee area; and provide the inline sharing interface for presentation in place of the selected item.

36 Claims, 19 Drawing Sheets

(56) References Cited

U.S. PATENT DOCUMENTS

| | | | |
|---|---|---|---|
| 2009/0217177 A1* | 8/2009 | DeGrazia | G06F 3/0481 |
| | | | 715/753 |
| 2010/0037153 A1* | 2/2010 | Rogers | G06F 3/0481 |
| | | | 715/758 |
| 2012/0109737 A1* | 5/2012 | Setty | G06Q 30/0242 |
| | | | 705/14.41 |
| 2012/0221952 A1* | 8/2012 | Chavez | G06Q 10/00 |
| | | | 715/733 |
| 2012/0222135 A1* | 8/2012 | Chavez | H04N 21/4104 |
| | | | 726/29 |
| 2013/0155112 A1* | 6/2013 | Paretti | G09G 5/14 |
| | | | 345/646 |
| 2013/0155116 A1* | 6/2013 | Paretti | G09G 5/14 |
| | | | 345/667 |
| 2013/0191762 A1* | 7/2013 | Rajagopalan | H04L 12/1818 |
| | | | 715/753 |
| 2013/0290818 A1* | 10/2013 | Arrasvuori | H04N 21/4383 |
| | | | 715/201 |
| 2014/0188997 A1* | 7/2014 | Schneiderman | H04L 51/32 |
| | | | 709/204 |

\* cited by examiner

INLINE RESHARING

CROSS-REFERENCE TO RELATED APPLICATIONS

The present application claims priority, under 35 U.S.C. § 119, of U.S. Provisional Patent Application No. 61/902,084, filed Nov. 8, 2013 and entitled "Inline Resharing," the entirety of which is hereby incorporated by reference.

BACKGROUND

There are a number of services or computing platforms that have proliferated recently. For example, social networks, videos viewing services, or document services based in the cloud or accessible via the Internet have all become popular. While many users may join such services, they have difficulty using many of the features offered by such systems. One issue is the user interfaces to access the information provided by these systems.

With the development of these systems, especially social networks, users are presented with much more information. The interfaces to use and access that information have become more complex with the user of multiple windows, pop up screens and other mechanisms that can be distracting to the user. Also when multiple actions are being taken having such multiple windows can be confusing and out of context.

SUMMARY

According to one innovative aspect of the subject matter in this disclosure, a system includes a processor and a memory storing instructions that, when executed, cause the system to: provide items of content for presentation; receive input identifying a selected item from the items of content; generate an inline sharing interface corresponding to the selected item, the inline sharing interface including a portion of original content from the selected item, an comment area, and an addressee area; and provide the inline sharing interface for presentation in place of the selected item.

In general, another innovative aspect of the subject matter described in this disclosure may be embodied in methods that include providing items of content for presentation; receiving input identifying a selected item from the items of content; generating an inline sharing interface corresponding to the selected item, the inline sharing interface including a portion of original content from the selected item, an comment area, and an addressee area; and providing the inline sharing interface for presentation in place of the selected item.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include receiving input via inline sharing interface; and responsive to the received input being a share command, sending a message including the portion of the original content and a comment. For instance, the features may further include wherein the inline sharing interface is sized to be similar to the selected item; or wherein resizing the inline sharing interface includes adjusting the size of one or more of the portion of original content from the selected item, the comment area, and the addressee area.

For instance, the features may further include after the message has been sent, modifying the selected item to indicate that the selected item has been shared; and providing the modified selected item for presentation in place of the inline sharing interface, or receiving input via the comment area or the addressee area of the inline sharing interface that affects a dimension of the inline sharing interface; and resizing inline sharing interface for the input; or receiving input via the comment area or the addressee area of the inline sharing interface that affects a dimension of the inline sharing interface; and adjusting a scroll position of a view port showing the inline sharing interface.

These implementations are particularly advantageous in a number of respects. For instance, the technology described herein provides an inline resharing interface that allows the user to understand the context in which the content being reshared was presented. More specifically, the inline resharing interface is placed in the stream of content in place of the original content being reshared. Additionally, the inline resharing interface includes much of the content of the original item or tile and is presented in a format in the inline resharing interface that is very similar to how the content will appear when shared. The inline resharing interface is presented in a manner that is seamless and natural for the user to navigate to the inline resharing interface then back to the stream content. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure relates to a system and methods for inline resharing of a stream of content. The present disclosure advantageously provides systems and methods for generating an inline resharing interface to present content to the user, allow the user to input comments and perform a sharing or resharing action. The inline resharing will be described in the context of a stream of content provided by a social network accessed by a desktop computer; however, it should be understood that the principles of the present disclosure are applicable to other areas and platforms. For example, the present disclosure may be applied to performing resharing in response to notifications, email, video sharing, music sharing, newsfeeds, review of online documents, spreadsheets, presentations, or other contexts where content is presented to the user. Furthermore, while the present disclosure is described below in the context of desktop computing, it could also be used in mobile or tablet computing. Moreover, for this application the term "resharing" or "sharing" may refers to review of content in a stream provided by a social network and sending that content to other users in the social network. However, more generally, the terms "resharing" or "sharing" are used interchangeably and may refer to any information presented in other contexts and sending that original information or modified versions of the original information to others.

Figure 1:
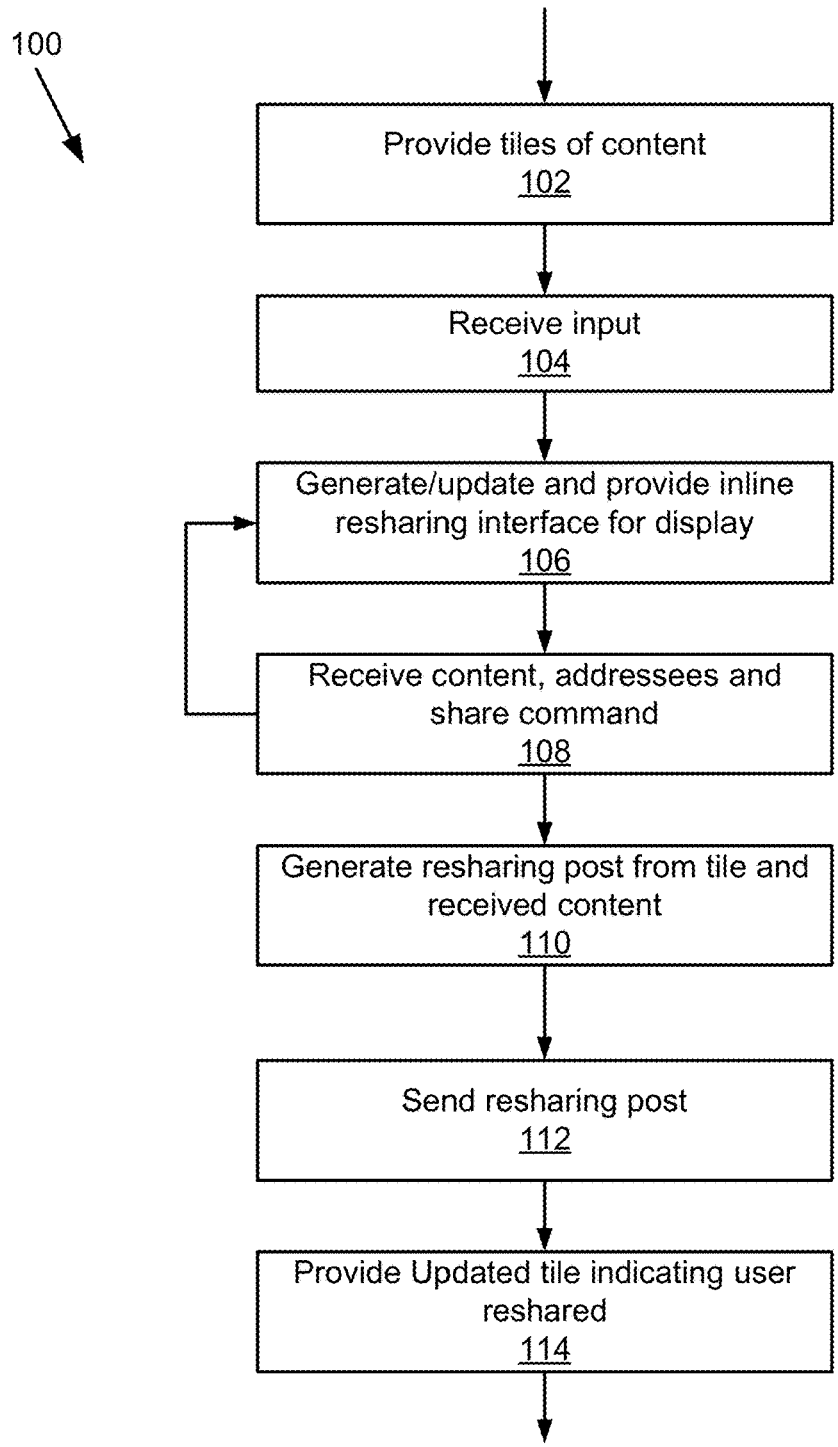
FIG. 1 is a flow chart illustrating an example method for resharing.
Figure 7A:
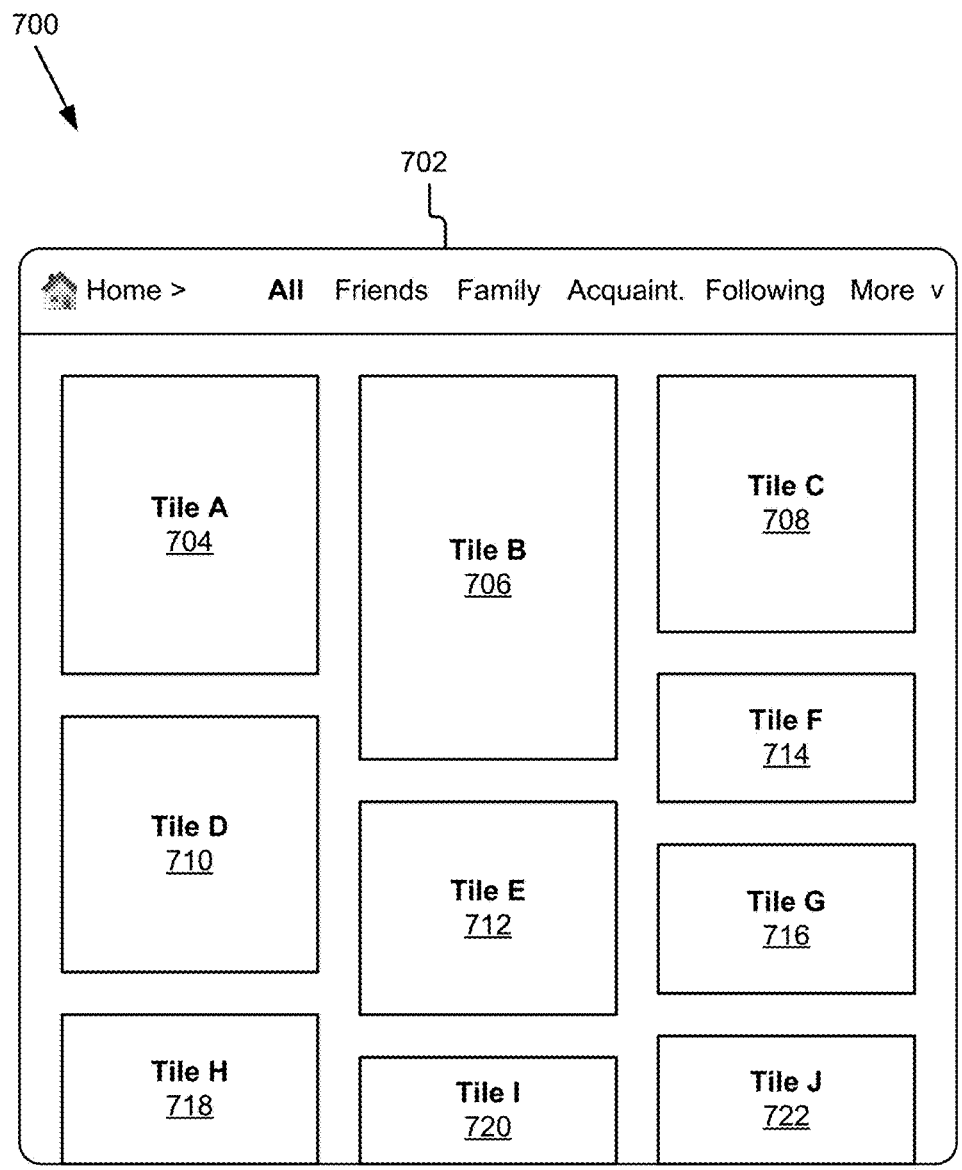
FIG. 7A is a graphic representation of an example user interface for presenting a stream of content.
Figure 8A:
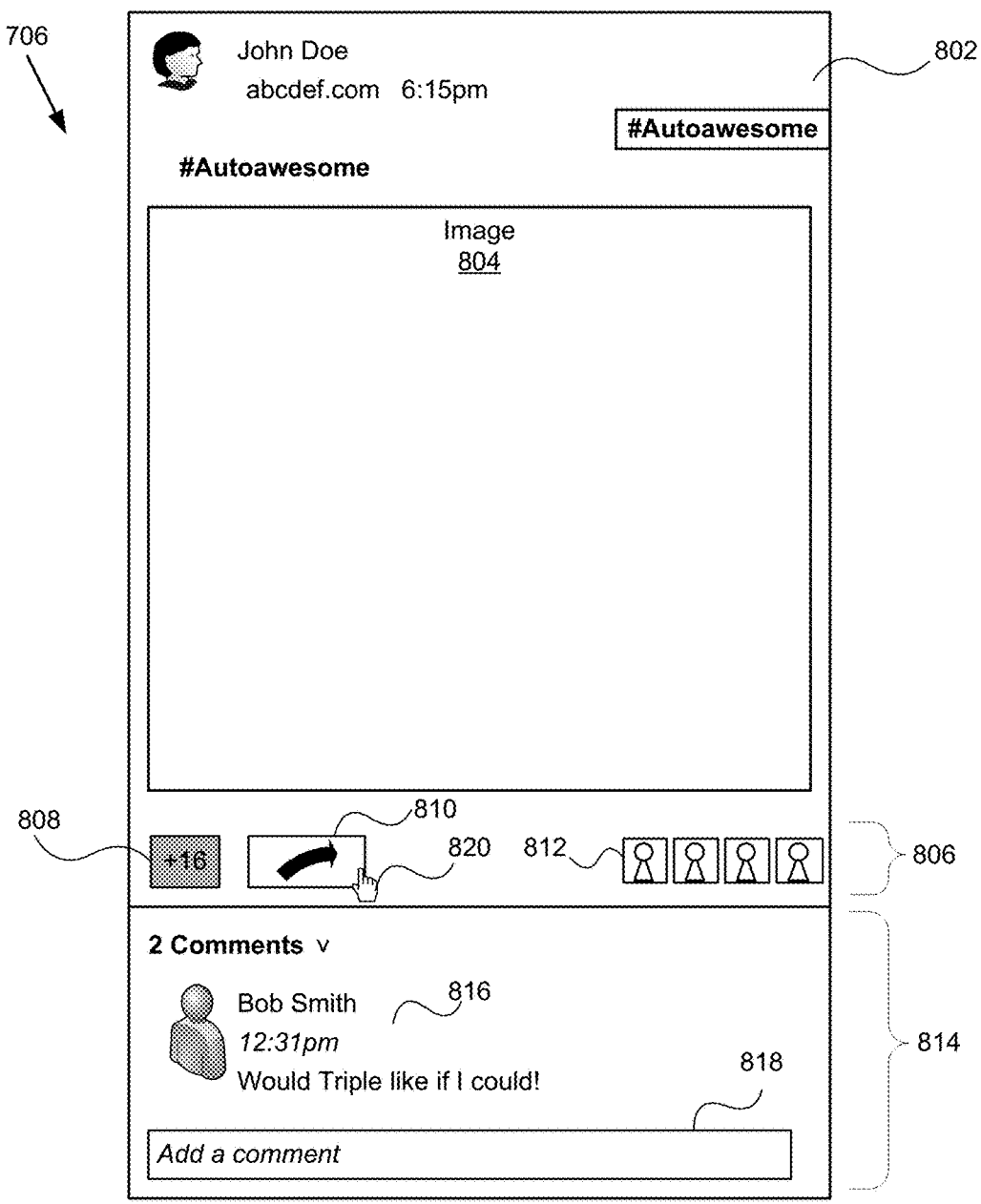
FIG. 8A is a graphic representation of an example tile of a stream of content.

FIG. 1 is a flow chart illustrating an example method 100 for performing resharing is described. The method 100 begins by retrieving a stream of content for a user and providing 102 that stream of content as a series of tiles. One embodiment for such an interface is shown in FIG. 7A. Each of the tiles presented may include videos, images, text, links, buttons, text boxes, etc. to interact with the content presented in that tile. An example of one such tile 706 is shown in FIG. 8A. It should be understood that all the tiles A to J 704-722 could include similar buttons, content and functionality similar to that of tile B 706. Next, the method 100 receives 104 input. The input could be selection of a buttons, menus, content, the addition of text, a mouse over the additional content, muting a commenter, identify content as spam, etc. If the input was the selection of a resharing button, the method 100 continues to generate and provide 106 an inline resharing interface for display. The inline resharing interface is presented to the user, in place of the original tile of content. The present disclosure is particularly advantageous because it presents the resharing interface at the same location that the tile/original content was displayed. Moreover, the resharing interface is sized to match or approximate the size of the original tile. This is advantageous because it allows the user to select content for sharing, share the content and returned to the exact context at which the user was before sharing. Furthermore, the sharing interface also includes much of the original content that was displayed. Therefore, even though the user is interacting with the resharing interface, it is immediately obvious to the user what content they are about to share in post. Using the inline resharing interface, the user can input content (e.g., comments), addressees to which to send the comment and the original content, and a share command. The inline resharing module 403 receives 108 the comments, addressees, the share command or the canceled command. In response, the method 100 returns to block 106 and updates the resharing interface or transitions to block 110. In block 110, the method 110 generates a resharing post from the original content of the tile and from the received content from block 108. Once the post is been generated, the method 100 sends 112 the resharing post. Once the post has been sent, the method generates an updated tile that indicates that the user has reshared the content of the tile, and provides 114 the updated tile in the user interface in place of the original tile. After block 114, the method 100 can process additional inputs as the user continues to interact with the stream of content.

Figure 2:
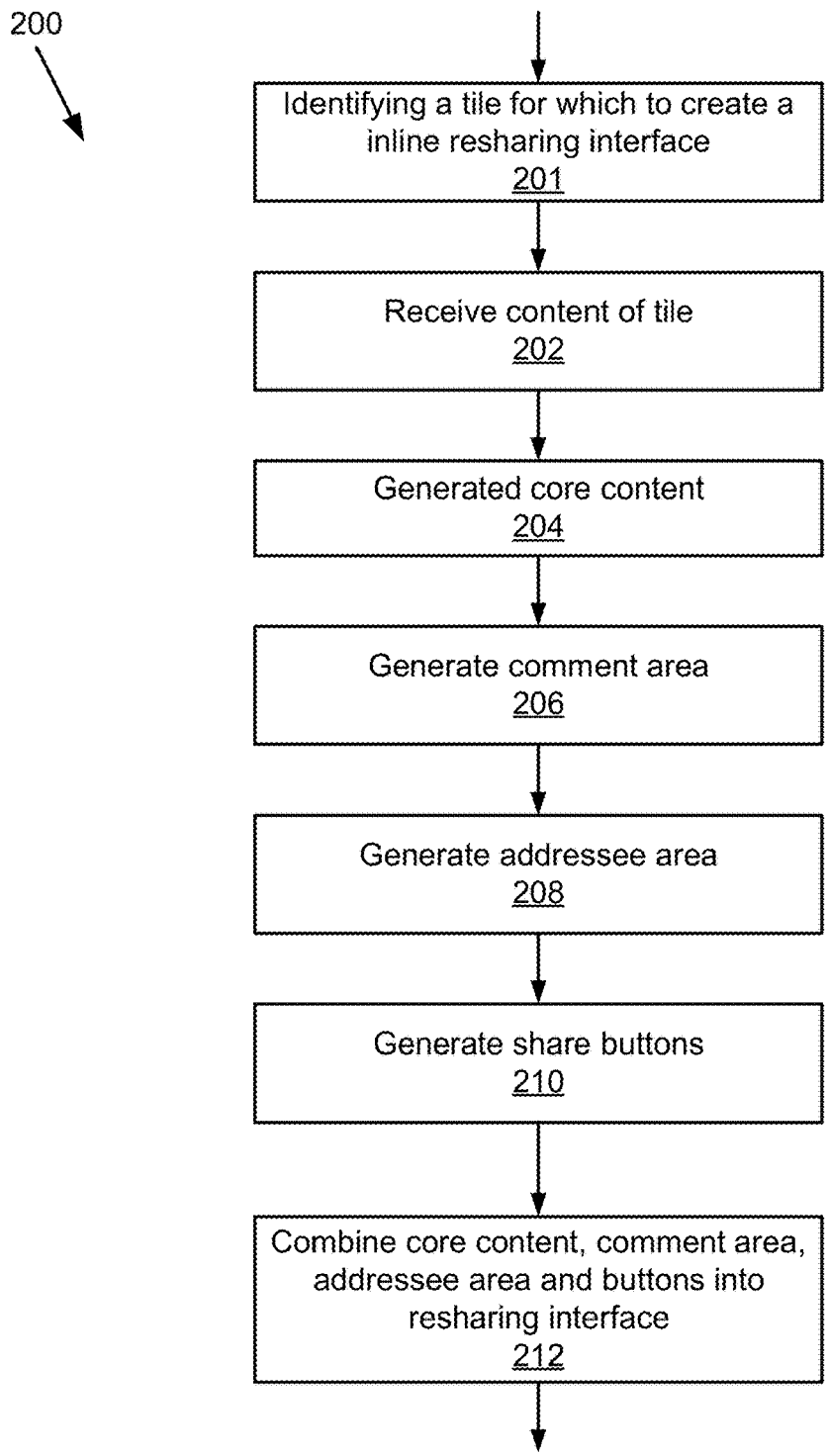
FIG. 2 is a flow chart illustrating an example method for generating a resharing interface.

Referring now to FIG. 2, an example method 200 for generating a resharing interface will be described. The method 200 begins by identifying 201 a tile for which to create a corresponding inline resharing interface. Identification of the tile will identify the size and shape of the inline resharing interface as well as the original content to include in the inline resharing interface. Next the method 200 receives 202 or retrieves the original content of the identified tile of block 201. Then the method 200 generates 504 a core content area from the content received in block 202. The method 200 also generates 206 a comment area, generates an addressee area 208 and generates share button 210. Examples of these areas will be described in more detail below with reference to FIG. 8B. Once the components have been generated, the method 200 combines 212 them into the inline resharing interface.

Figure 3:
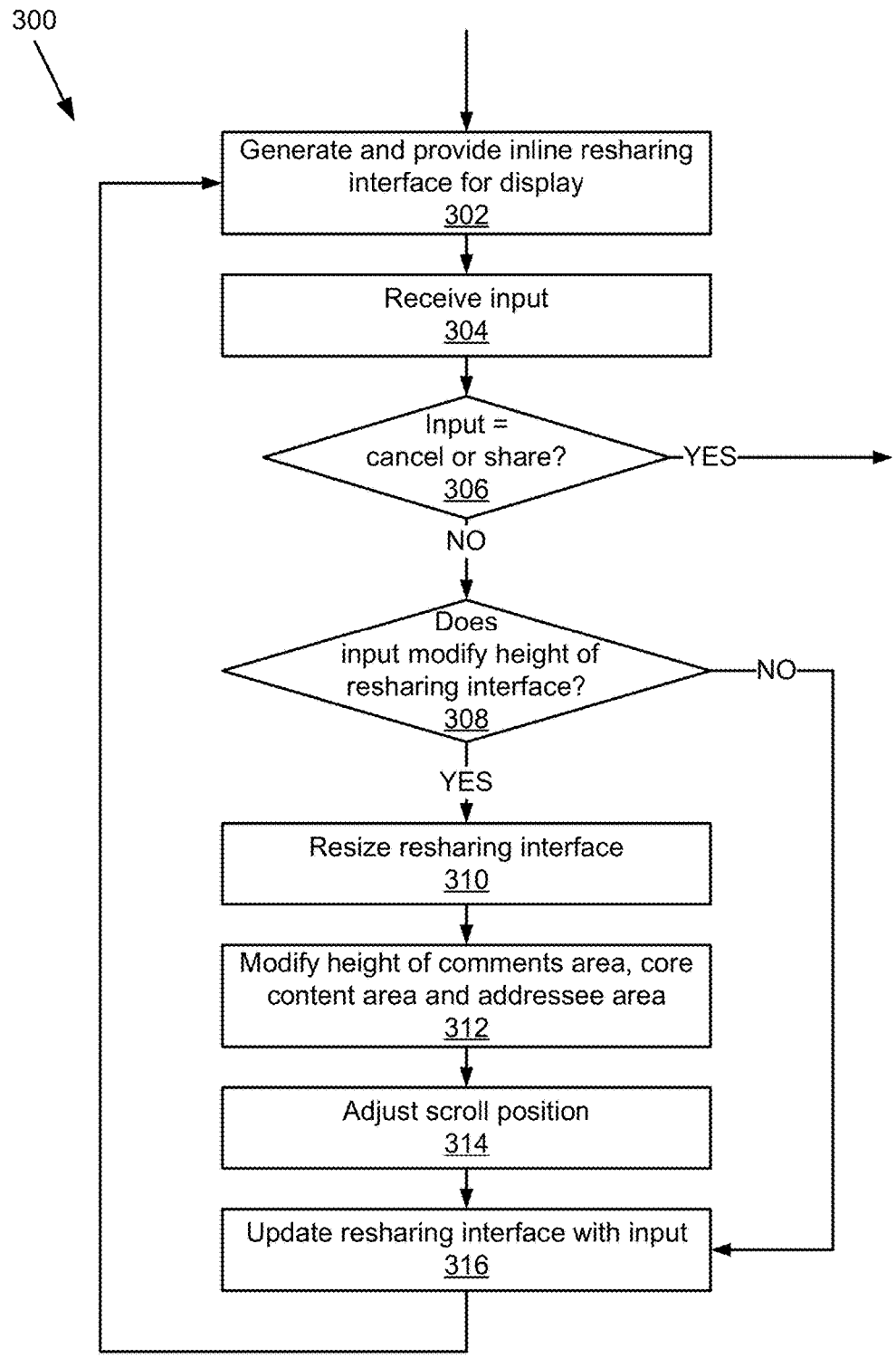
FIG. 3 is a flow chart illustrating an example method for sizing the resharing interface.

The present disclosure is particularly advantageous because the inline resharing interface is sized to match the size of the tile which it replaces in the stream of content. In other words, the present disclosure reuses the tile area or card area for a completely new function of generating a resharing post. Furthermore, as the user inputs additional content, for example comments or addressees, the inline resharing interface is resized and rendered based on the modifications to the size of the interface caused by addition of content. Referring now to FIG. 3, an example method 300 for sizing the inline resharing interface is described. The method 300 begins by generating and providing 302 the inline resharing interface as has been described above with reference to FIG. 2. Although not shown, in some instances, the resizing and scrolling adjustments described below may also occur when the inline resharing interface is originally generated and provided for display in block 302. Then the method 300 receives 304 additional input. The method 300 determines 306 whether the input is the canceled or share command. If so, the method returns to displaying the original tile in the case of a cancel command, or proceeds to post/reshare the content with comments and display an updated tile in the case of a share command as was described above with reference to FIG. 1. On the other hand, if the input was not the cancel or share command, the method 300 continues to determine 308 whether the input modifies the dimensions of the inline resharing interface. For example, the addition of comments or addressees may modify the height of the inline resharing interface. If not, the method continues to update 316 the inline resharing interface with the input received in block 304 after which the method returns to block 302 to generate and provide the inline resharing interface with the additional input to the user. However, if the input modifies the dimensions of the inline resharing interface, the method 300 continues to resize 310 the dimensions of the inline resharing interface. For example, the height of the inline resharing interface may be increased vertically to heights greater than the original tile to accommodate the additional input in the comments area or the addressee area. The method 300 continues to modify 312 the height of the comments area, the core content area or the addressee area based on the input. In particular, any of the comments area, the core content area or the addressee area may be increased in size or decreased in size so that they collectively fit within the resized inline resharing interface. For example, if there are a number of comments but no new addressees, the comments area may be enlarged while the core content area and the addressee area are reduced so when they are combined they fit within the resized inline resharing interface. In some instances, an algorithm may be employed to optimize the size of each of the areas. For example, the default may be to provide 40% of the height for the comment area, 25% of the height to the core content area and 35% of the height for the addressees and share buttons. Those skilled the art will recognize that other percentage allocations may be used. The algorithm may also have minimum and maximum heights for each of the areas. The algorithm will provide a dynamic allocation of space based upon whether there are comments, there are addressees, and the size of the original tile. In some instances, the algorithm will maximize the height of the core content area if possible. In some instances, there are set ratios for each of the areas. In some instances, the vertical area is maximized to the size of the viewport regardless of the size of the original tile so that the original content and resharing actions are visible. In cases where the inline resharing interface does not fit within the viewport, the areas will be reduced but the button area will be maintained so that the user can transition from the inline resharing interface. The method 300 continues by adjusting 314 the scroll position so that the inline resharing interface is visible to the user. After block 314, the method continues to block 316 as has been described above.

Figure 4:
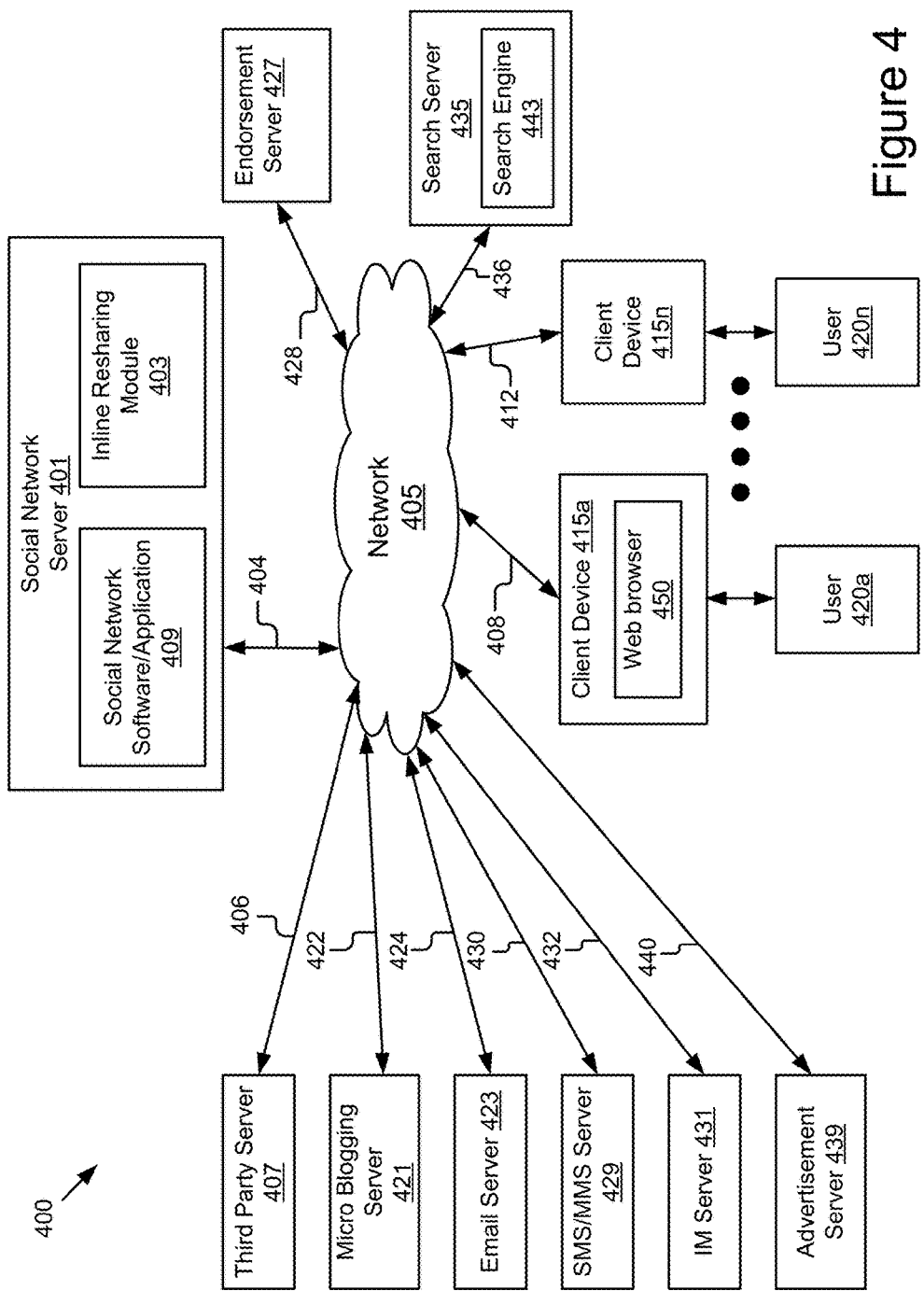
FIG. 4 is a high-level block diagram illustrating an example system for inline resharing.

FIG. 4 illustrates a high-level block diagram of a system 400 for inline resharing in a stream of content according to some implementations of the present disclosure. The illustrated system 400 includes client devices 415a-415n (also referred to herein individually and collectively as 415) that are accessed by users 420a-420n (also referred to herein individually and collectively as 420), and a social network server 401 having a social network application 409 and an inline resharing module 403. The system 400 also includes a number of products or services offered by a social network server 401, a third party server 407, a micro blogging server 421, an email server 423, a Short Message Service (SMS)/Multimedia Messaging Service (MMS) server 429, an Instant Messaging (IM) server 431, a search server 435 including a search engine 443, an endorsement server 427 and an advertisement server 439. In the illustrated implementation, these entities are communicatively coupled via a network 405. These other systems 401, 407, 421, 423, 427, 429, 431, 435 and 439 are merely examples and the system 400 in some implementations includes a document server, a blogging server, a news feed server, a video sharing server, a photo sharing server, a map server and any other third party server, etc.

The client devices 415a-415n in FIG. 4 are used by way of example. While FIG. 4 illustrates two client devices 415a and 415n, the present disclosure applies to any system architecture having one or more client devices 415. The client devices 415 may include a web browser 450 for accessing and interacting with content provided by other servers or accessible via the Internet. Furthermore, while only one network 405 is coupled to the client devices 415a-415n, the social network server 401 and the other product servers 407, 421, 423, 427, 429, 431, 435, and 439, in practice one or more networks 405 can be connected to the entities. Furthermore, while only one third party server 407 is shown, the system 400 may include one or more third party servers 407.

In some implementations, the social network server 401 is coupled to the network 405 via signal line 404. The social network server 401 also includes a social network software/application 409. Although only one social network server 401 is shown, it should be recognized that multiple servers may be present. A social network may be any type of social structure where the users are connected by a common feature. The common feature includes relationships/connections, e.g., friendship, family, work, an interest, etc. The common features are provided by one or more social networking systems, for example, those included in the system 400, including explicitly-defined relationships and relationships implied by social connections with other online users, where the relationships form a social graph. In some examples, the social graph can reflect a mapping of these users and how they are related. Furthermore, it should be understood that the social network server 401 and the social network software/application 409 are representative of one social network and that there may be multiple social networks coupled to the network 405, each having its own server, application and social graph. For example, a first social network may be more directed to business networking, a second may be more directed to or centered on academics, a third may be more directed to local business, a fourth may be directed to dating and others of general interest or a specific focus.

While shown as operational on the social network server 401 in FIG. 4, in some implementations all or part of the inline resharing module 403 may be operational on the third party server 407 or any other servers 401, 421, 423, 427, 429, 431, 435 and 439. The inline resharing module 403 interacts with the other servers 401, 407, 421, 423, 427, 429, 431, 435 and 439 via the network 405. The inline resharing module 403 is also coupled for communication with the client device 415a, which is connected to the network 405 via signal line 408. The user 420a interacts with the client device 415a. Similarly, the client device 415n is coupled to the network 405 via signal line 412 and the user 420n interacts with the client device 415n. It should be recognized that the inline resharing module 403 can be stored in any combination of the devices and servers, or in only one of the devices or servers.

The network 405 may be a conventional type, wired or wireless, and may have any number of configurations, for example, a star configuration, token ring configuration or other configurations. Furthermore, the network 405 may include a local area network (LAN), a wide area network (WAN) (e.g., the Internet), and/or any other interconnected data path across which multiple devices may communicate. In some implementations, the network 405 may be a peer-to-peer network. The network 405 may also be coupled to or include portions of a telecommunications network for sending data in a variety of different communication protocols.

In some implementations, the network 405 includes Bluetooth communication networks or a cellular communications network for sending and receiving data, e.g., via short messaging service (SMS), multimedia messaging service (MMS), hypertext transfer protocol (HTTP), direct data connection, WAP, email, etc.

The social network server 401 is coupled to the network 405 via signal line 404 for communication and cooperation with the other components of the system 400. The social network server 401 interacts with the third party server 407 that is coupled to the network 405 via signal line 406, the micro blogging server 421 that is coupled to the network 405 via signal line 422, the email server 423 that is coupled to the network 405 via signal line 424, the Short Message Service (SMS)/Multimedia Messaging Service (MMS) server 429 that is coupled to the network 405 via signal line 430, the instant messaging (IM) server 431 that is coupled to the network 405 via signal line 432, the search server 435 that is coupled to the network 405 via signal line 436, the endorsement server 427 that is coupled to the network 405 via signal line 428 and/or the advertisement server 439 that is coupled to the network 405 via signal line 440.

In some implementations, the social network server 401 receives and sends data and social information provided by the other systems 407, 421, 423, 427, 429, 431, 435 and 439 in a social network. For example, the social network server 401 receives and sends any social information or events performed on any web pages and/or applications hosted by the other systems 401, 407, 421, 423, 429, 431, 435 and 439. The web pages and/or applications include a user interface allowing a user to comment or endorse a product, a video, a search result, a widget, a post, a comment, a photo, an article, etc., shown on the web pages and/or applications.

In some implementations, the social network server 401, the third party server 407, the micro blogging server 421, the email server 423, the endorsement server 427, the SMS/MMS server 429, the IM server 431, the search server 435 and the advertisement server 439 are hardware servers including a processor, a memory, and network communication capabilities. The client devices 415 can be portable computing devices. It should be understood that these systems 401, 407, 415, 421, 423, 427, 429, 431, 435 and 439 could be any computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. As will be described below, it should be understood that the present technologies can operate on different models other than a client-server architecture. For example, the client devices 415 may include the inline resharing module 403 and include different services.

Figure 5:
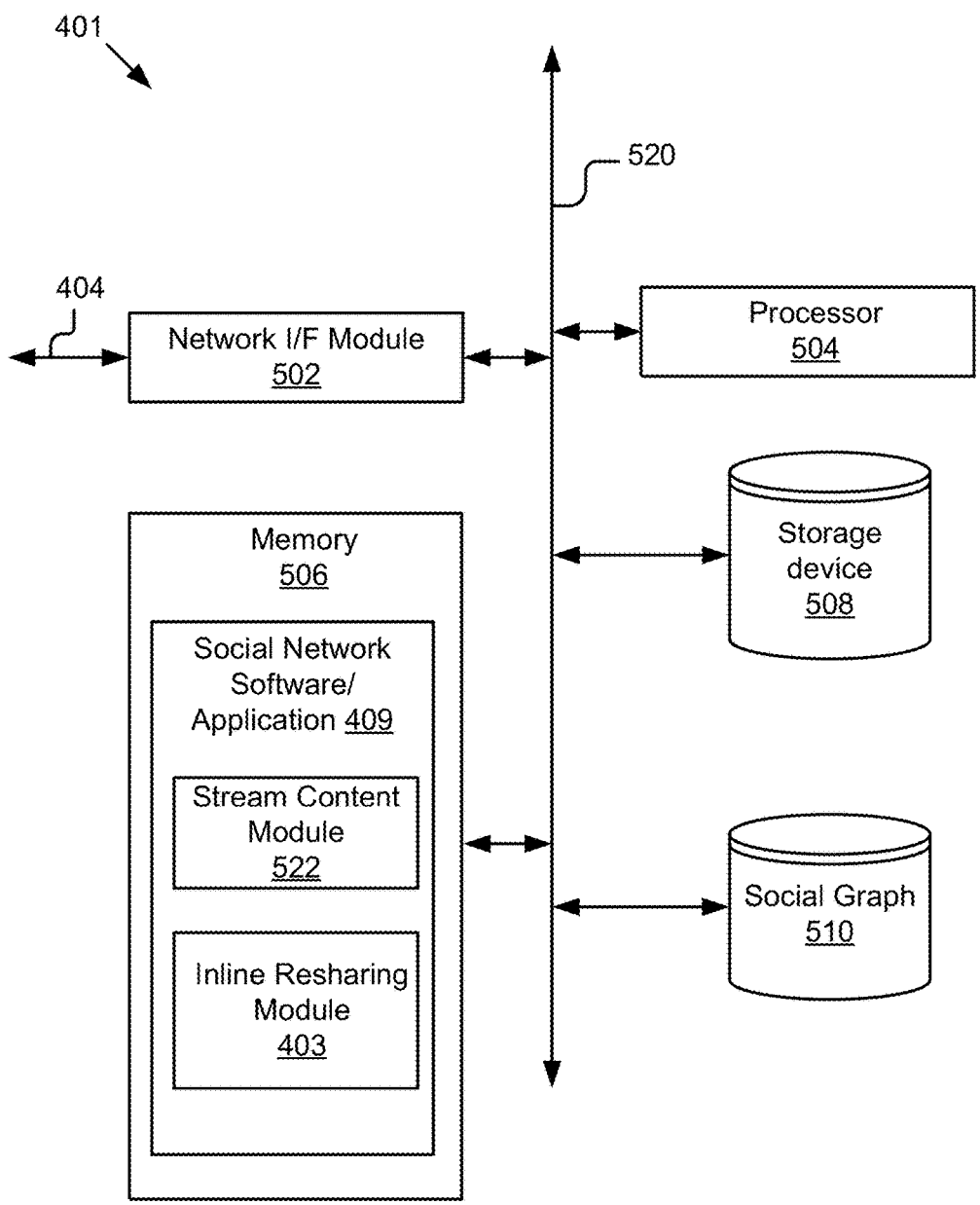
FIG. 5 is a block diagram illustrating an example social network server including an inline resharing module.

FIG. 5 illustrates the social network server 401 according to some implementations of the present disclosure. In this implementation, the social network server 401 includes the network interface (I/F) module 502, a processor 504, a memory 506, a storage device 508 and a social graph 510. These components of the social network server 401 are communicatively coupled to a bus or software communication mechanism 520 for communication with each other.

The network interface module 502 is coupled to the network 405 by signal line 404. The network interface module 502 is also coupled to the bus 520. The network interface module 502 includes ports for wired connectivity including but not limited to USB, SD, or CAT-5, etc. The network interface module 502 links the processor 504 to the network 405 that may in turn be coupled to other processing systems. The network interface module 502 provides other conventional connections to the network 405 using standard network protocols, e.g., TCP/IP, HTTP, HTTPS and SMTP. In some implementations, the network interface module 502 includes a transceiver for sending and receiving signals using WiFi, Bluetooth® or cellular communications for wireless communication.

The processor 504 may include an arithmetic logic unit, a microprocessor, a general purpose controller or some other processor array to perform computations and provide electronic display signals to a display device. The processor 504 is coupled to the bus 520 for communication with the other components. Processor 504 processes data signals and may include various computing architectures including a complex instruction set computer (CISC) architecture, a reduced instruction set computer (RISC) architecture, or an architecture implementing a combination of instruction sets. Although only a single processor is shown in FIG. 5, multiple processors may be included. It should be understood that other processors, operating systems, sensors, displays and physical configurations are possible.

The memory 506 stores instructions and/or data that may be executed by the processor 504. In the illustrated implementation, the memory 506 stores the social network application 409 having a stream content module 522 and the inline resharing module 403. In some instances, the inline resharing module 403 may be separate from the social network application 409 as shown in FIG. 4. The inline resharing module 403 may cooperate with the social network application 409 to generate and provide the inline resharing interface, receive comments, send/post messages with original content and comments, and update the original content items or tiles related to the stream of content and other functionality provided by the social network application 409. The operation of the inline resharing module 403 is described in more detail with reference to FIGS. 1-3 and 6. The inline resharing module 403 may be software including routines for generating and providing the inline resharing interface feature of the social network. In some implementations, the inline resharing module 403 may be a set of instructions executable by the processor 504 to provide the functionality for generating and providing the inline resharing interface. In some implementations, the inline resharing module 403 may be stored in the memory 506 of the server 401 and is accessible and executable by the processor 504. In some implementations, the inline resharing module 403 may be adapted for cooperation and communication with the processor 504 and other components of the server 401 via bus 520.

The social network application 409 is shown as including the stream content module 522. Based upon the user's interests, social graph, interactions and other factors, the social network application 409, in particular the stream content module 522, may generate a stream of content tailored to the user. The inline resharing module 403 generates and provides the inline resharing interface for the stream of content. The memory 506 is coupled to the bus 520 for communication with the other components. The instructions and/or data may include code for performing any and/or all of the techniques described herein. The memory 506 may be a dynamic random access memory (DRAM) device, a static random access memory (SRAM) device, flash memory or some other memory devices.

The storage 508 may be a non-transitory memory that stores data. For example, the storage 508 may be a gamic random access memory (DRAM) device, a static random access memory (SRAM) device, flash memory or some other memory device. In some implementations, the storage 508 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device.

In some implementations, the social graph 510 may be a non-transitory memory that stores the social graph. In some examples, the social graph 510 can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, etc.

Software communication mechanism 520 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS etc.). The software communication mechanism 520 can be implemented on any underlying hardware, for example, a network, the Internet, a bus, a combination thereof, etc.

Figure 6:
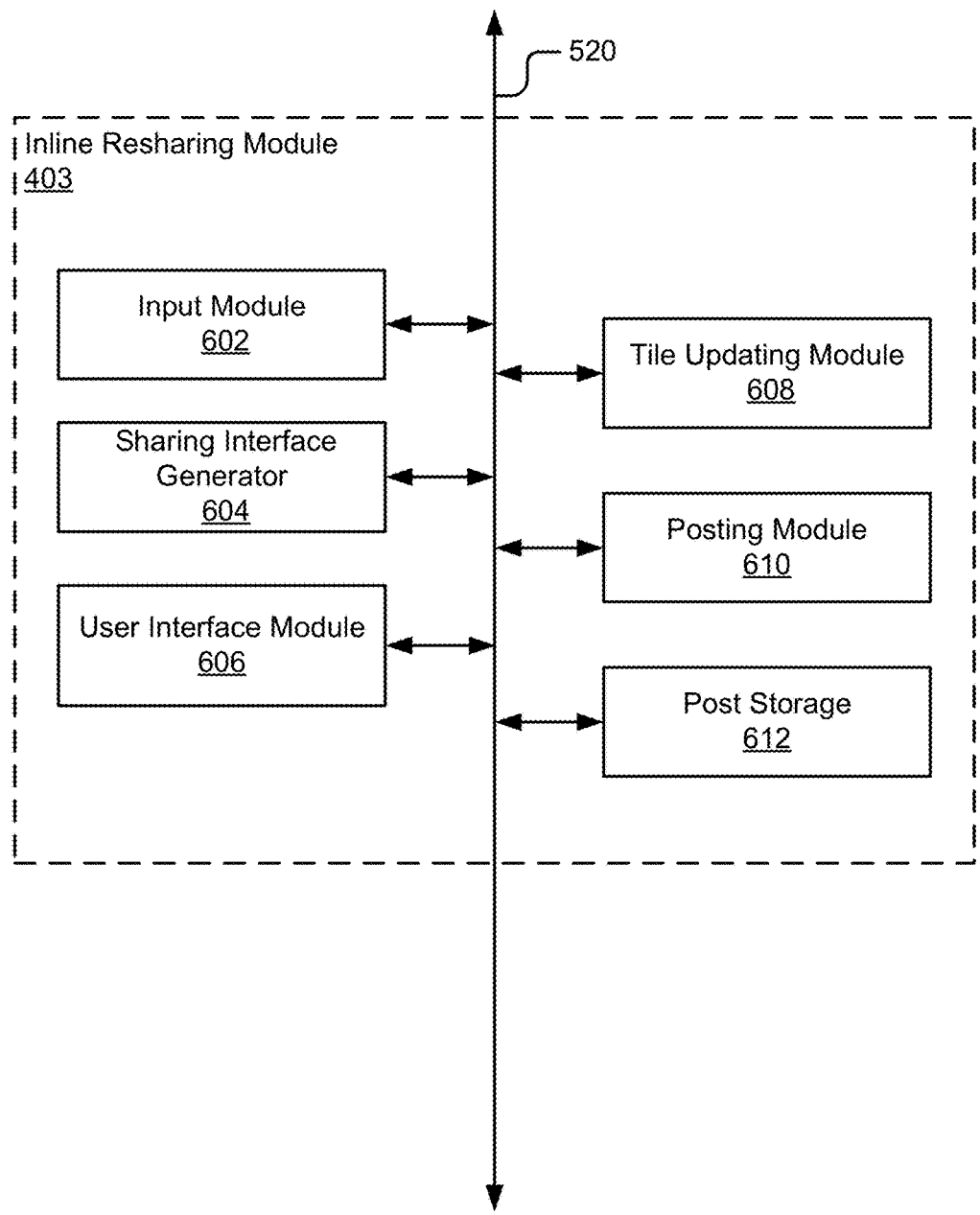
FIG. 6 is a block diagram illustrating an example inline resharing module.

As shown in FIG. 6, the inline resharing module 403 is described in more detail. The inline resharing module 403 includes an input module 602, a sharing interface generator 604, a user interface module 606, a tile updating module 608, a posting module 610 and post storage 612. Each of these components 602, 604, 606, 608, 610 and 612 may be coupled to the software communication mechanism 520 for communication with each other and the other components of the social network server 401.

The input module 602 can be software or routines for receiving and processing input from a user interacting with the stream of content or the inline resharing interface. The input module 602 receives input from a user via the client device 415, the network 405 and the social network server 401. For example, the input may be to share a content item, to transition to the inline resharing interface, to add comments, to add addressees, to post the comment, etc. Examples of other inputs will be described below with reference to FIGS. 8A-8D. In some instances, the input module 602 may also act as a controller to control the operations of the inline resharing module 403 and perform the methods of the present disclosure as was described in more detail above with reference to FIG. 1-3. The input module 602 is coupled to the software communication mechanism 520 for communication with the other components of the inline resharing module 403 and the social network server 401.

Figure 7B:
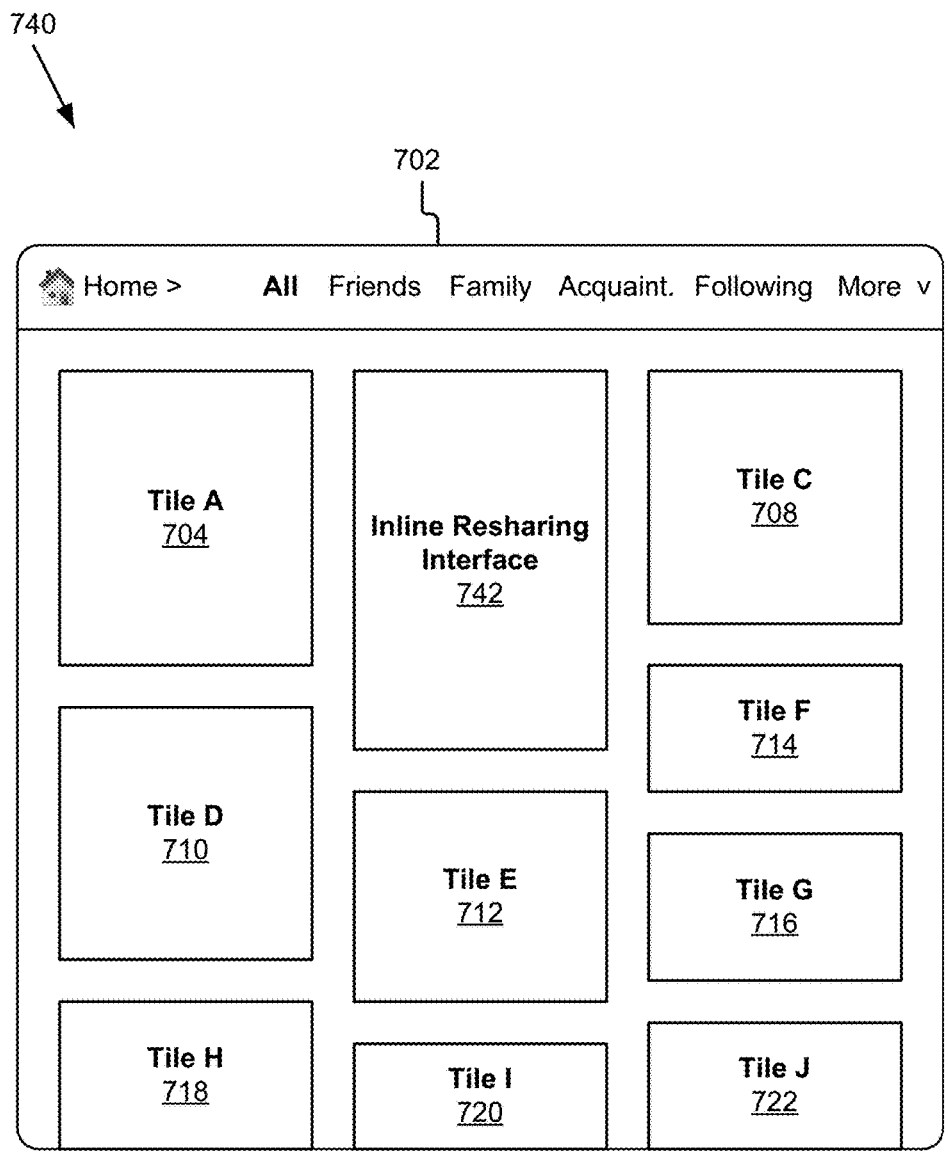
FIG. 7B is a graphic representation of an example user interface for presenting a stream of content including an inline resharing interface.
Figure 8B:
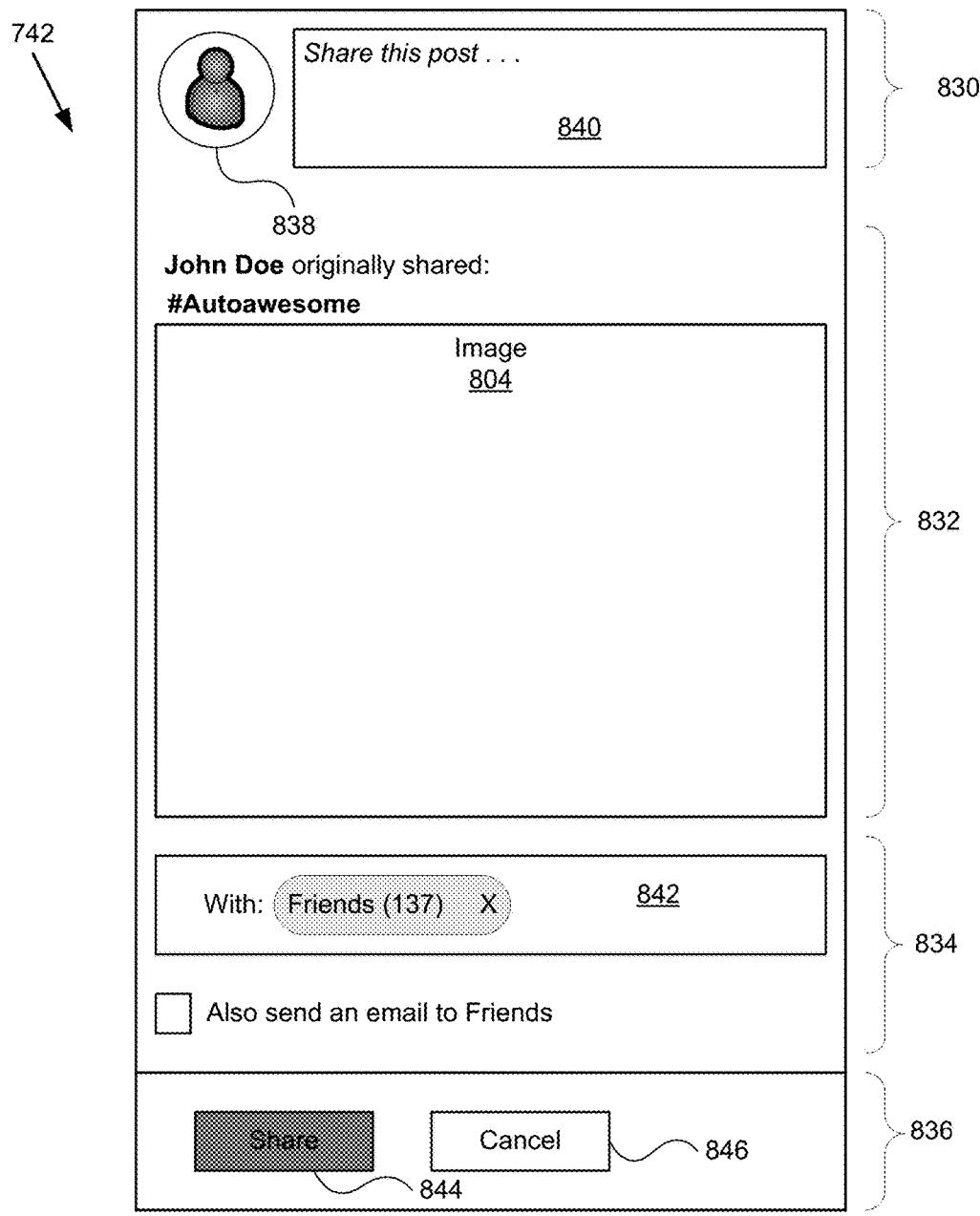
FIG. 8B is a graphic representation of an example inline resharing interface.

The sharing interface generator 604 can be software or routines for generating the inline resharing interface 742 (see also FIGS. 7B and 8B). One example of the inline resharing interface 742 is shown and described below with reference to FIG. 8B. The sharing interface generator 604 produces the inline resharing interface 742 and provides it to the user interface module 606 for presentation to the user. The sharing interface generator 604 is responsive to signals from the input module 602 to produce an inline resharing interface 742 for a given item or tile in the stream of content. More specifically for some instances, the sharing interface generator 604 identifies the item or tile from the stream of content, retrieves the original content corresponding to that tile, generates a comment area 830, generates a core content area 832, generates an addressee area 834, and generates a selection area 836. Once these components of been generated, the sharing interface generator 604 combines them, organizes them and sizes them appropriately to produce the inline resharing interface 742. In some instances, each of these components will have a minimum and maximum size, and the sharing interface generator 604 is responsible for allocating space for each of the components while adhering to the size minimums and maximums for each component. In some instances, the core content area 832 or the inline resharing interface 742 are sized within a threshold of a size of the selected item or tile 706 in the stream of content. In some instances, the core content area 832 or the inline resharing interface 742 are positioned within a threshold of the position of the selected item or tile 706 in the stream of content. In some instances, sharing interface generator 604 may determining the portion of original content from the selected item based upon at least one factor from a group of factors including: size of the selected item, size of a display upon which the inline sharing interface is presented, relationship of the selected item to other posts, content type, content quality, author of the selected item, endorsements of the selected items, reshares of the selected item, a fixed area of the inline sharing interface for the original content, a percentage of area of the inline sharing interface for the original content, a minimum area of the inline sharing interface for the original content, and a maximum area of the inline sharing interface for the original content.

In some instances, the sharing interface generator 604 is also responsible for matching the size of the inline resharing interface 742 to the size of the tile that is replacing. The sharing interface generator 604 may also adapt the size of the components as the user inputs additional information (e.g., comments or addressees). The sharing interface generator 604 is coupled to the software communication mechanism 520 for communication with the other components of the inline resharing module 403 and the social network server 401.

The user interface module 606 can be software or routines for presenting the stream of content and the inline resharing interface 742. In some implementations, the user interface module 306 sends the content items and interfaces a client device 415 via bus 520 and network 405. More specifically, the user interface module 606 is responsible for presenting the inline resharing interface 742. The user interface 606 is also responsible for creating and displaying visual effects for the transition between the display of a tile in a stream of content and the display of the inline resharing interface 742 instead in that stream of content, or the transition between the display of the inline sharing interface 742 in a stream of content and the updated tile in the stream of content. For example, the user interface module 606 may keep some elements of the original content consistent as they transform from the tile to the inline resharing interface 742. Similarly, the user interface module 606 may transform other portions of a tile or item of content to a what you see is what you get (WYSIWYG) like form to share that content (e.g., the inline resharing interface 742). Further, the user interface module may adjust the scroll position and the content height to fit relevant controls within the viewport. The user interface module 606 is coupled by the software communication mechanism 520 to receive control signals from the input module 602 and the inline resharing interface 742 from the sharing interface generator 604. The user interface module

606 is also coupled by the software communication mechanism 520 to provide the user interface and updates to the user interface as will be described below with reference to FIG. 7A-11C.

Figure 7C:
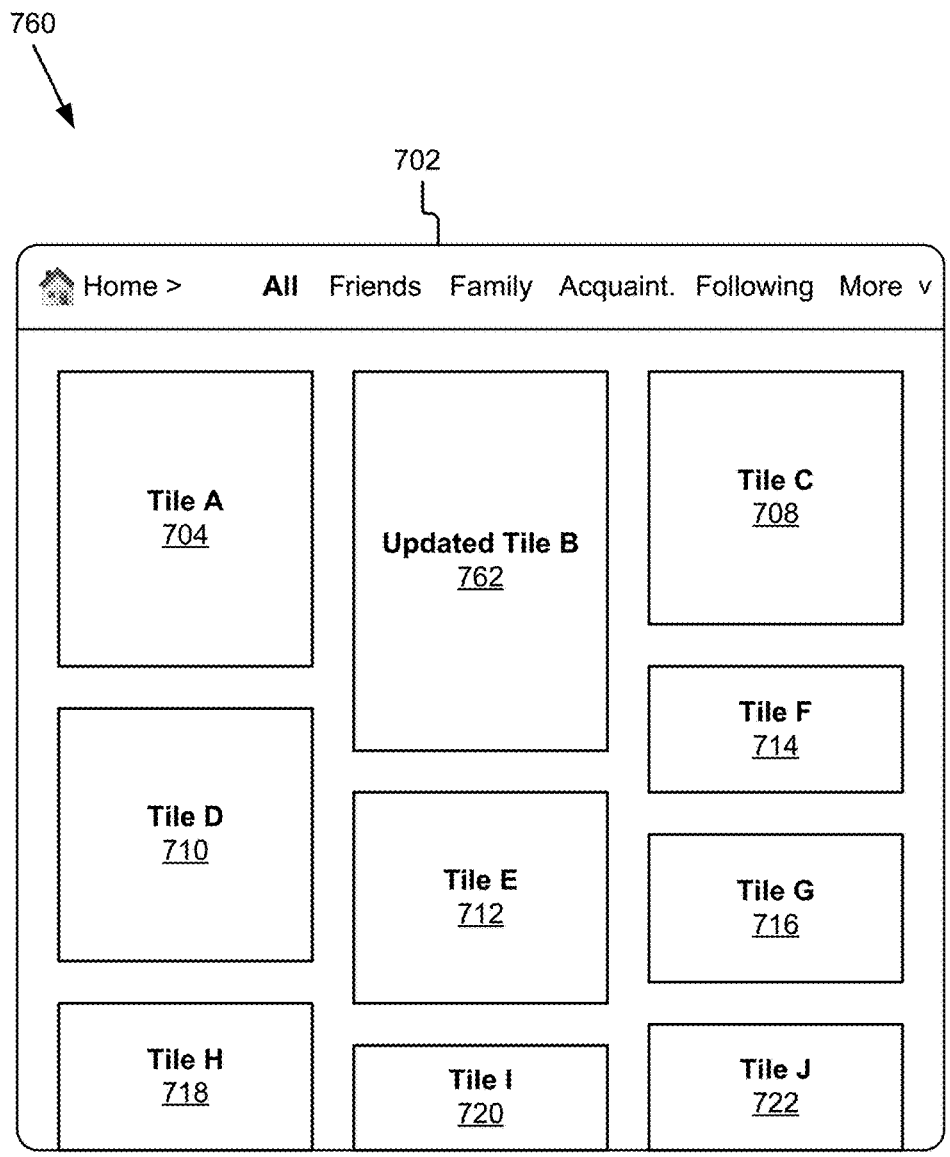
FIG. 7C is a graphic representation of an example user interface for presenting a stream of content including an updated tile.
Figure 8C:
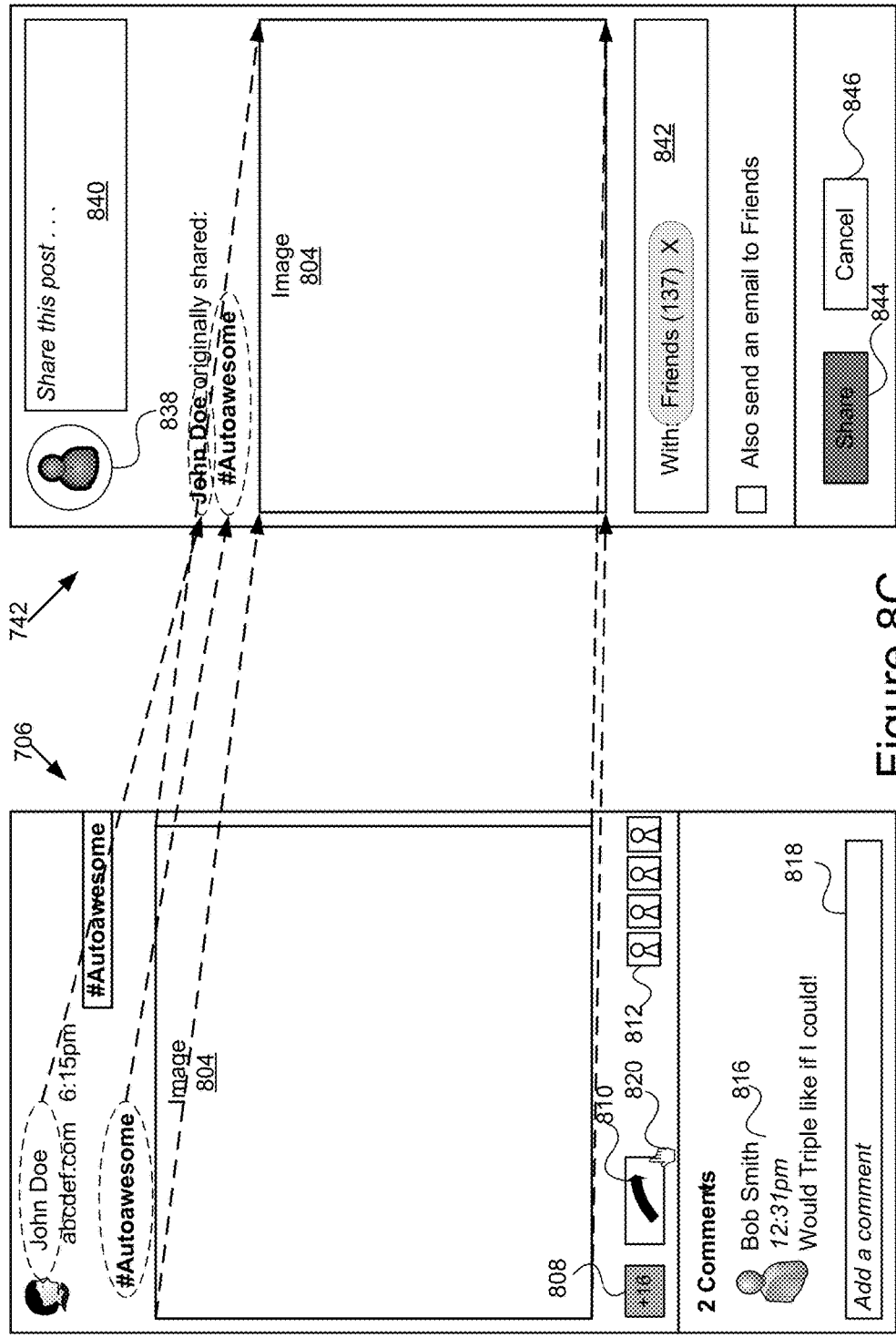
FIG. 8C is a graphic representation of an example animation or transition from a tile of a stream of content to the inline resharing interface.
Figure 8D:
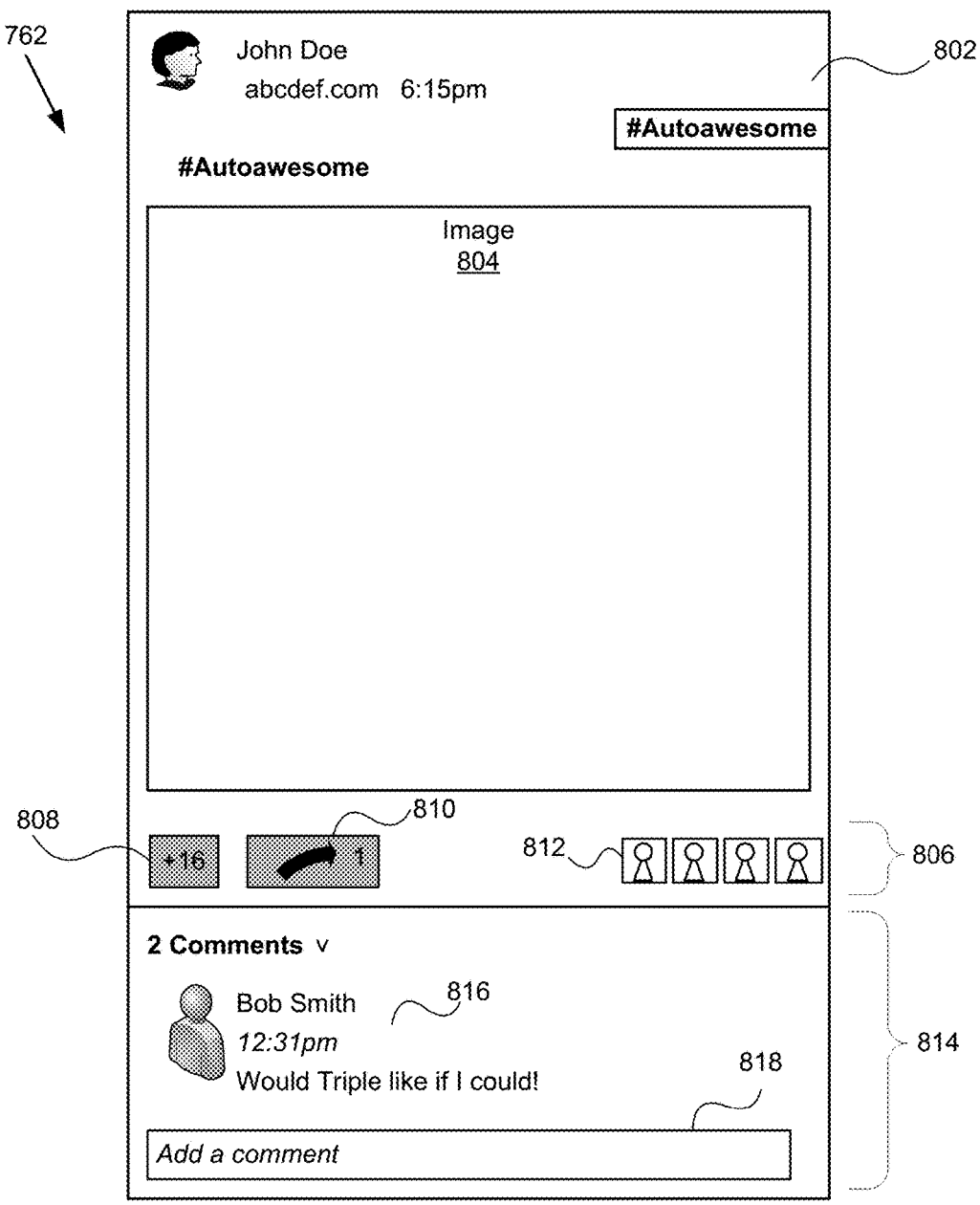
FIG. 8D is a graphic representation of an example updated tile.

The tile updating module 608 can be software or routines for generating an updated tile 762 (see also FIGS. 7C and 8D). The tile updating module 608 generates an updated tile once the user has selected the content of the item and shared it with others. The user interface presented to the user is updated with the updated tile 762 displayed in place of the original tile. For example, the updated tile 762 may be the same as the original tile but with the sharing button shown in a visually distinct manner and possibly indicating the number of times the content item has been shared. The tile updating module 608 is coupled by the software communication mechanism 520 to receive an indication that a tile has been shared from the posting module 610. The tile updating module 608 is also coupled by the software communication mechanism 520 to send the updated tile to the user interface module 606 for presentation to the user.

The posting module 610 can be software or routines for generating a post or reshare and sending it to the social network application 409. The posting module 610 is coupled to the sharing interface generator 604 or the post storage 612 to retrieve the information needed to generate the post. The inline resharing module 403 advantageously provides an interface 742 that presents an image which closely resembles what the generated post will look like. Based on the information used to generate the inline resharing interface 742, that same information can be used to generate the resulting post. In some instances, the posting module 610 retrieves this information from the sharing interface generator 604. In some instances, the posting module 610 retrieves this information from the post storage 612. The posting module 610 is coupled by the software communication mechanism 520 to the social network application 409.

The post storage 612 may be a data store for storing information about original tiles, original content for tiles, information necessary to generate and present the inline resharing interface 742, or updated tiles. The posting storage 612 stores information used by the other modules of the inline resharing module 403. It should be noted that there may be times when several inline resharing interfaces 742 are in existence and only some of them are visible on the display viewport of the user. In such instances, the post storage 612 may be used to store the original content for the tiles, the information for the inline resharing interfaces, and updated tiles. More specifically, the information used to generate the inline resharing interface 742 may be stored in this post storage 612, and later it may be then used by the posting module 610 to render or generate the post that is sent to the social network application 409. The post storage 612 may also be used to store other information relevant to the inline resharing of content. The post storage is coupled by the software communication mechanism 520 to the other components of the inline resharing module 403.

FIG. 7A is a graphic representation of an example user interface 700 for presenting a stream of content. The user interface 700 includes a window having a header area 702, and a plurality of tiles 704-722 (tile A to tile J). The header includes a home button for returning to the home page of a social network and a series of filters that can be applied to the stream of content being presented. In this implementation, the user interface 700 includes three columns of tiles. However, it should be understood that other implementations of the user interface 700 may have fewer or greater numbers of columns. For example, for a mobile device (not shown), the user interface may only include a single column of tiles. In the example of FIG. 10B there are 2 columns of tiles. Each tile 704-722 may vary in height depending on the content being presented, user preferences, window size, etc. Although not shown, each tile 704-720 may include text, posts, graphic images, photos, thumbnail images of videos, links, action buttons, etc. Each tile 704-720 may also include functional buttons for expanding or minimizing the size of the tile. One example for tile B 706 is shown below in FIG. 8A. In general, the tiles 704-722 are ordered left to right and top to bottom by order of rank. For example, tile C 708 at the end of the first row has a higher rank than tile D 710 at the beginning of the second row of tiles. It should be noted that FIG. 7A illustrates the user interface 700 with no inline resharing interface or updated tile, and including only tiles corresponding to content items.

FIG. 7B is a graphic representation of an example user interface 740 for presenting a stream of content and an inline resharing interface 742. The user interface 740 includes the header area 702, a plurality of tiles 704, 708-718 (Tile A, Tile C to Tile H), and an example of the inline resharing interface 742. An example of the inline resharing interface 742 is shown and described below with reference to FIG. 8B. As can be seen, the inline resharing interface 742 has the approximately the same size and position as Tile B 706 of FIG. 7A. In this implementation, the header area 702 is positioned proximate the top of the window and the tiles 704, 708-718 are arranged in three columns ordered by rank left to right and top to bottom. The inline resharing module 403 advantageously blends or mixes the inline resharing interface 742 with the social content tiles 704-718. The inline resharing interface 742 has the approximately the same size and position as the Tile B 706 that it replaces. This is advantageous because it makes the inline resharing interface 742 seamlessly integrated into the stream of content. Instead of requiring that the user navigate to a different window or area to share content, the inline resharing interface 742 is inserted into the mainstream of content provided by the social network, accessible in one place that is already the focus of the user's attention. This approach allows users to easily access and use the resharing capabilities of the system.

FIG. 7C is a graphic representation of an example user interface 760 for presenting a stream of content and an updated tile 762. This user interface 760 is provided and presented to the user after the user has selected a tile (e.g., Tile B 706), interacted with the inline resharing interface 742 and shared and/or commented on the tile. Again, the user interface 760 includes the header area 702, a plurality of tiles 704, 708-718 (Tile A, Tile C to Tile H), and an example of the updated tile 762. An example of the updated tile 762 is shown and described below with reference to FIG. 8D. As can be seen, the updated tile 762 has the approximately the same size and position as Tile B 706 of FIG. 7A and the inline resharing interface 742 of FIG. 7C. In this implementation, the header area 702 is positioned proximate the top of the window and the tiles 704, 708-718 are arranged in three columns ordered by rank left to right and top to bottom. The inline resharing module 403 advantageously blends or mixes the updated tile 762 with the social content tiles 704-718. This provides a clear indication of what content in what tiles has been reshared.

FIGS. 8A-8D are graphic representations of example user interfaces or tiles 706 for content, the inline sharing interface 742, and updated tiles 762.

Referring now to FIG. 8A, an example tile 706 for an item of content in the stream of content is shown. Each of the tiles of FIG. 7A may include the same or similar functionality or different functionality. In general, each of the tiles includes a header area 802 indicating the source and other information about the content, a content area, for example including an image 804, an action area 806 and a comment area 814.

Referring now specifically to tile B 706 shown in FIG. 8 A, the header area 802 in this example includes: 1) an image associated with the user that is providing the content, 2) a username, 3) a web address, domain name, handle, etc., 4) a time the content was provided, 5) a tag, and 6) a caption for the content.

The content of the tile is an image 804. Alternatively, the content of the tile 706 could be text, audio, video, hypertext links, a photo album, etc. Selecting the content may allow control for the presentations display of the content.

The action area 806 provides buttons 808, 810 for possible actions that can be taken with regard to the tile 706 and its content and a plurality of thumbnails 806 of users that have commented on, endorsed or interacted with the content of the tile. More specifically, the action area 806 includes an endorsement button 808 that allows the user to endorse the content in the tile 706. The endorsement button 808 is also shown in a visually distinct manner indicating that there are endorsements or there are a predetermined number of endorsements. The endorsement button 808 may also include a number that indicates the number of endorsements of the content that have been made. The action area 806 also includes a re-share button 810. When selected, the display is updated from the content tile 706 of FIG. 8A and the user interface of FIG. 7A to the inline resharing interface 742 of FIG. 8B and the user interface of FIG. 7B. FIG. 8A also shows a cursor or selector 820 selecting the reshare button 810.

Finally, the content tile 706 provides a comment area 814. In the comment area, an image of the user, their name, a time and a comment 816 are provided. There is also an indication of the number of comments about this content tile 706 as well as a selector button to show more comments or fewer comments. The comment area 814 also includes a comment box 818 that allows the user to directly comment on the content tile 706.

FIG. 8B is a graphic representation of an example inline resharing interface 742. The inline resharing interface 742 may include a comment area 830, a core content area 832, an addressee area 834, and a selection area 836. The inline resharing interface 742 is particularly advantageous because it provides to the user a close approximation or almost WYSIWYG like form showing the content and comments as they will be reshared.

The comment area 830 is positioned proximate the top of the inline resharing interface 742. In this example, the comment area 830 includes an image 838 associated with the user and a comments box 840 for the user to add comments about the original content.

The core content area 832 includes an indication or user name of the user that originally provided the content and an associated title for the content. The core content area 832 also includes the original content from the tile 706 only slightly reduced in size. The core content area 832 will include the same functionality for viewing, playing, expanding, reducing, etc. as was provided with the original content. In this example, the core content area 832 includes the same image 804 as the original tile 706.

The addressee area 834 provides an addressee box 842 for the user to enter the recipients to which the user would like to share the content. The addressee box 842 can be used to put in individual usernames, groups of individuals, or other pseudonyms used to identify other users of the social network. The addressee area 834 also includes a selectable box that will also generate an email and send it to the user's identified in the asked addressee box 842.

Finally, the inline resharing interface 742 includes a selection area 836 displaying a buttons 844, 846 to share or cancel the information provided in the user interface.

It should be understood that the inline resharing interface 742 of FIG. 8B is merely one example for the inline resharing interface and that various other configurations of this information may be possible within the principles of the present disclosure.

As noted above, when the user selects the reshare button 810 of FIG. 8A, the user interface is updated from that shown in FIG. 8A to that shown in FIG. 8B. Referring now also to FIG. 8C, the transition or animation from FIG. 8A to that shown in FIG. 8B will be described. The present disclosure is particularly advantageous because the interface provided in FIG. 8B attempts to include much of the same content as shown in FIG. 8A to reinforce to the user the content which they are sharing. As shown by dashed lines and dashed ellipses in FIG. 8C, some portions of the original content tile 706 correspond to or are part of the inline resharing interface 742. In some instances, the content is the same only modified is in size or format. Additionally, the present disclosure may use a number of different phase transitions to show the relationship between the original content and the content that is going to be shared. These phase transitions include inhale, exhale, and scale to draw the user's attention to the relevant next action. It should be understood that a variety of visual effects may be used to highlight the content that is being shared and the transition from the tile 706 of FIG. 8A to the interface 742 of FIG. 8B. For example, in some instances the content of the original tile shrinks so that it is shown with the addition of the interface controls (e.g., areas 830, 834 and 836 of FIG. 8B). In some instances, there are animation effects to show the transition from the content tile 706 to the inline resharing interface 742. In some instances, the animation effects are a pluggable component to the inline reshare interface 742 so that the type of animation may be modified in order to have a better experience without affecting the core inline resharing interface 742. In some instances, the user interface elements of the inline resharing interface 742 simultaneously slide below and above the original post author's name in the post content. For example, the comment area 830 slides in above the original content and the addressee area 834 and selection area 836 slide in below the original content area. In some instances, the other tiles (e.g., tile A, tile C to tile J of FIG. 7B) are shown shaded while the inline resharing interface 742 is not. In some instances, the background of the original post (e.g., area 832) in the inline resharing interface 742 is shown with a different background color. These and other visual fax may be used to draw the attention of the user to the transition from the in-line original tile 706 to the inline resharing interface 742. It should be understood, that if the browser above does not support transition (animations), they are not applied and the inline resharing interface 742 performs a simple replacement of content.

Referring now to FIG. 8D, an example updated tile 762 is shown. A comparison of FIG. 8A with FIG. 8D shows that the difference in the updated tile 762 is that the share button 810 is shown in a visually distinct manner, for example, in color or other highlighted manner. Also the share button 810 is updated to indicate the number of times that the content in tile 706 has been re-shared. Otherwise, the updated tile 762 has many of the same or similar elements as the user interface for presentation of the original content in tile 706.

Figure 9:
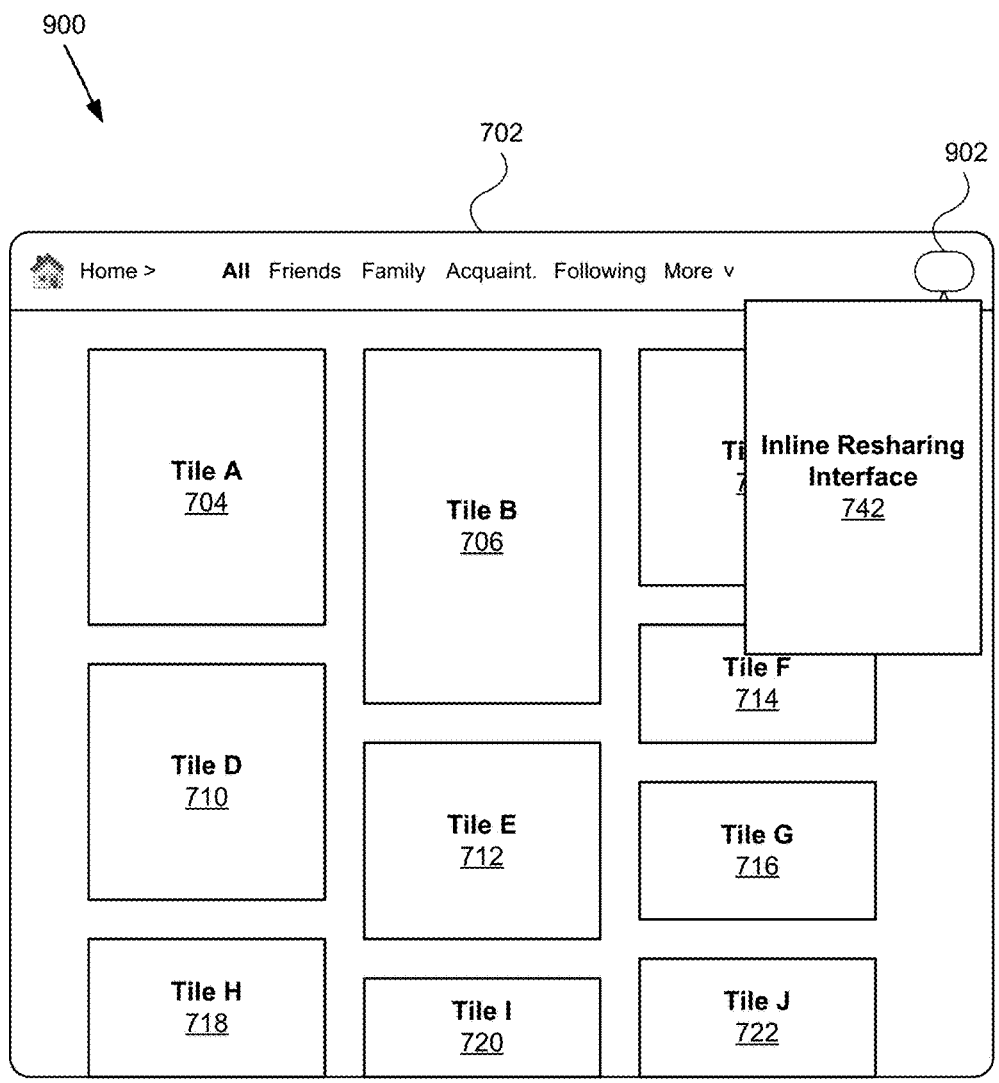
FIG. 9 is a graphic representation of an example inline resharing interface presented in response to selection of a notification.

Referring now to FIG. 9, another example use of the inline resharing interface 742 is shown. In this example, inline resharing interface 742 is presented to the user in response to selection of a notification button 902 in the header area of the window 900. The user may be viewing the stream of content. The window 900 in which the user views a stream of content may include the notifications button 902. If the user selects the notification button 902 to view additional content about the notifications, that content will be presented in a drop down box (not shown). That drop down box may include a reshare button similar to that described above with reference to FIG. 8A. Selection of the reshare button will result in the user interface 900 of FIG. 9. More specifically, the inline resharing interface 742 may be presented in place of the drop down box. The inline resharing interface 742 may have the same format and structure as described above with reference to FIG. 8B. This advantageously allows the user to re-share content within the context of the drop down box for the notification button. It should be understood that this is merely one example of how the inline resharing interface 742 may be used. The inline resharing interface 742 may be used in various other contexts, for example email interfaces, video sharing interfaces, document review interfaces, etc.

Figure 10A:
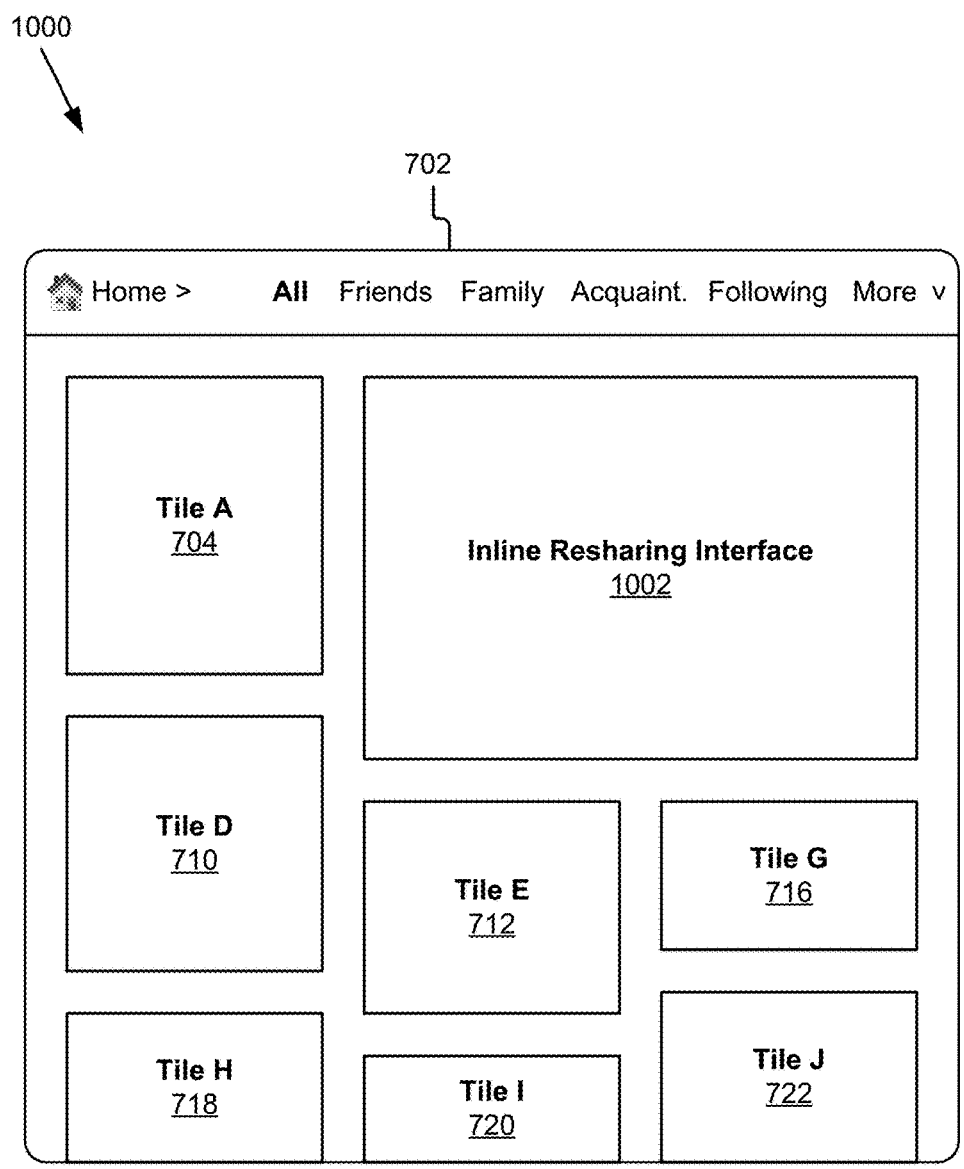
FIGS. 10A and 10B are graphic representations of another example user interface for presenting a stream of content including the inline resharing interface.
Figure 10B:
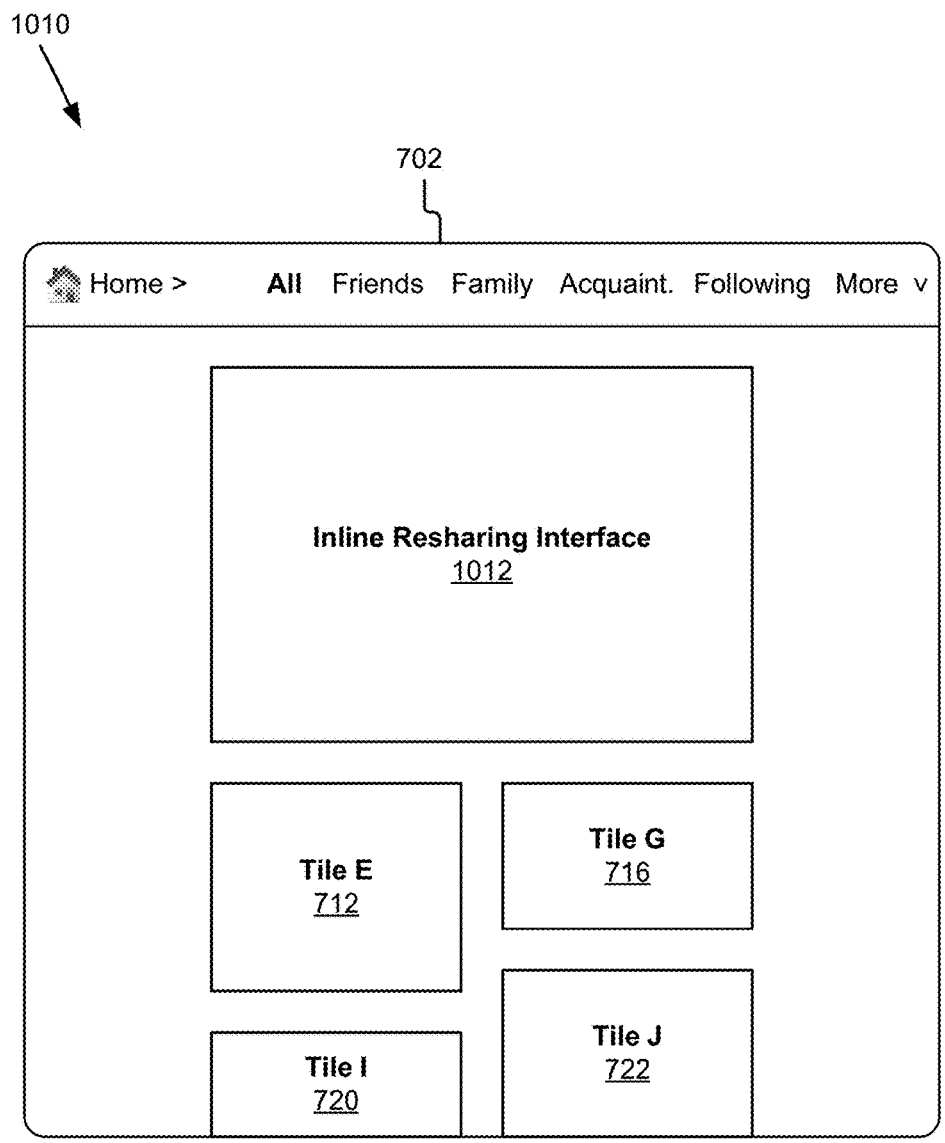

FIG. 10A is a graphic representation of another example user interface 1000 for presenting a stream of content including the inline resharing interface 1002. In this example, the original content tile (not shown) spanned two columns of tiles of the three columns of tiles in which the stream of content is being presented. FIG. 10A is used to illustrate that the inline resharing interface 1002 may be sized to match the original content tile. In this case, the original content tile had a width dimension of two columns, and after the user selects the re-share button, the in-line re-sharing module 103 produces the inline resharing interface 1002 that matches the dimension of the original content tile in both height and width, in this case to columns wide.

FIG. 10B is a graphic representation of another example user interface 1010 for presenting a stream of content including the inline resharing interface 1012. FIG. 10B is used to illustrate an example case where the stream of content is presented to the user in a window where the stream of content is two tiles wide. In this example, the original content tile (not shown) spanned two columns of tiles of the two columns of tiles in which the stream of content is being presented. Again, the inline resharing interface 1002 may be sized to match the original content tile, in this case two tiles wide. This is used to illustrate that independent of the stream of content, the inline resharing interface can be sized to roughly match and replace the original content tile.

Figure 11A:
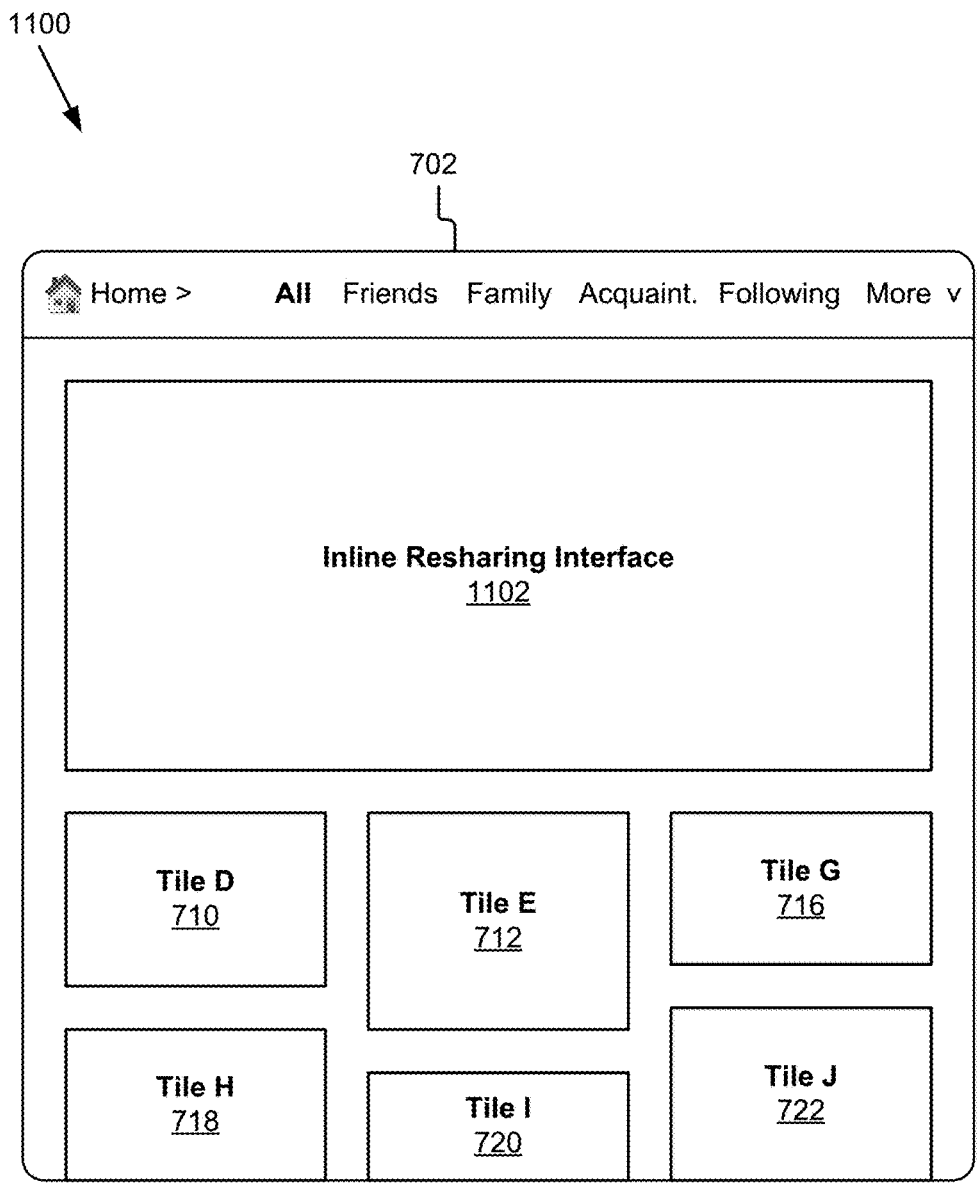
FIG. 11A is a graphic representation of another example user interface for presenting a stream of content including the inline resharing interface.

FIG. 11A is a graphic representation of another example user interface 1100 for presenting a stream of content including the inline resharing interface 1102. In this example, the stream of content is presented with a number of tiles and the stream of content is generally three tiles wide. However, there may be some tiles referred to as super posts that extend across the entire stream of content and that have a width that is generally three tiles wide. For these super post tiles, they may be replaced in accordance with the present disclosure with the inline resharing interface 1102 similar to how normal tiles are replaced with the inline resharing interface 742. FIGS. 9, 10A, 10B and 11A show the flexibility of the present disclosure in providing the inline resharing interface 1102 in various contexts independent of the format in which the stream of content, notification or other information is provided.

Figure 11B:
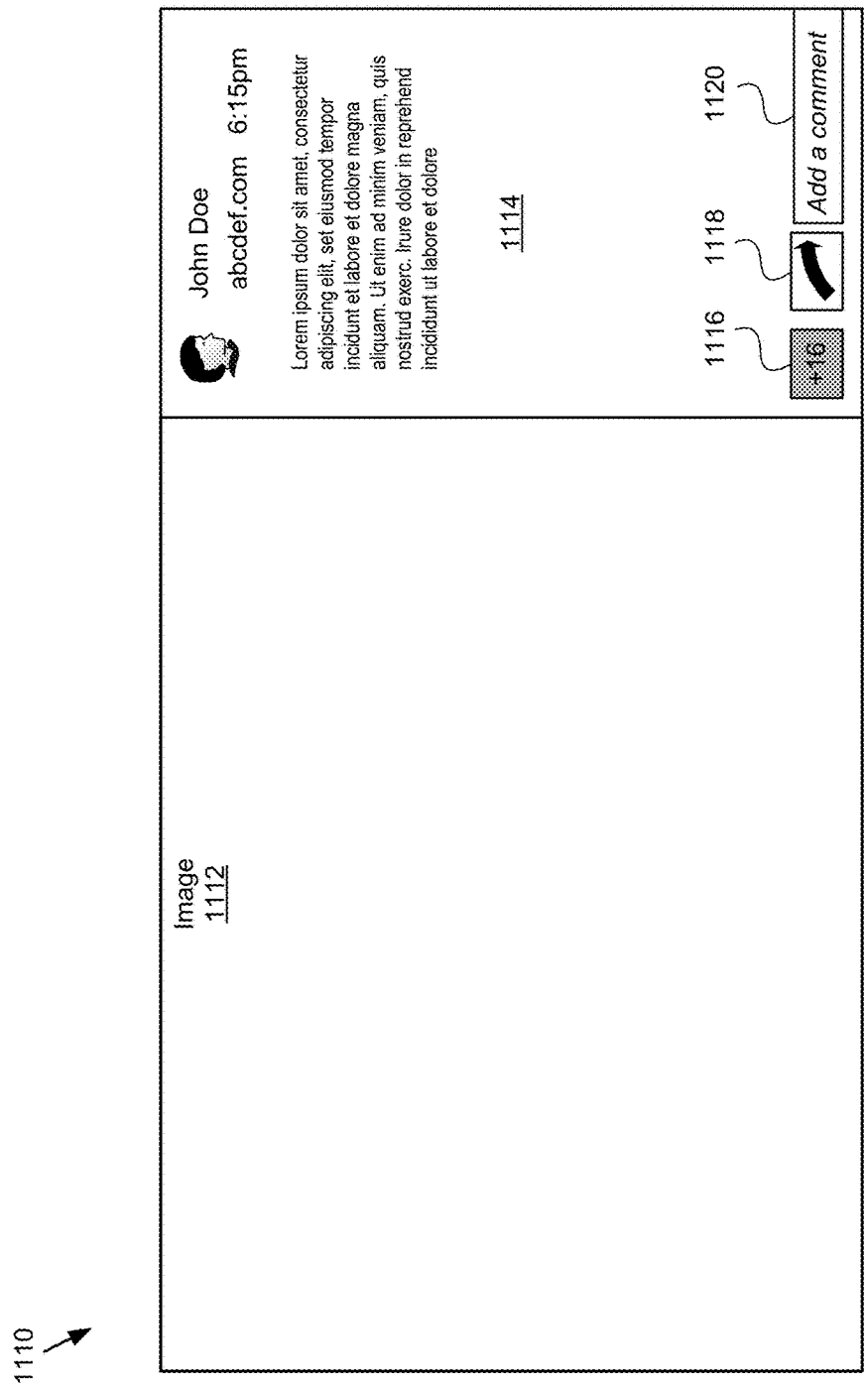
FIG. 11B is a graphic representation of an example tile of the stream of content of FIG. 11A.

FIG. 11B is a graphic representation of an example tile 1110 of the stream of content of FIG. 11A. As noted above, this example super post type tile 1110 is three normal tiles wide. The example tile 1110 includes an image 1112 or other original content and an informational area 1114. As with the other tiles, the informational area 1114 includes; 1) an image associated with the user that is providing the content, 2) a username, 3) a web address, domain name, handle, etc., 4) a time the content was provided, 5) other text describing the content, 6) an endorsement button 1116, 7) a reshare button 1118, and 8) a comment box 1120. FIG. 11 B illustrates an example super post type tile 1110 that is displayed in the stream of content prior to selection of the reshare button 1118.

Figure 11C:
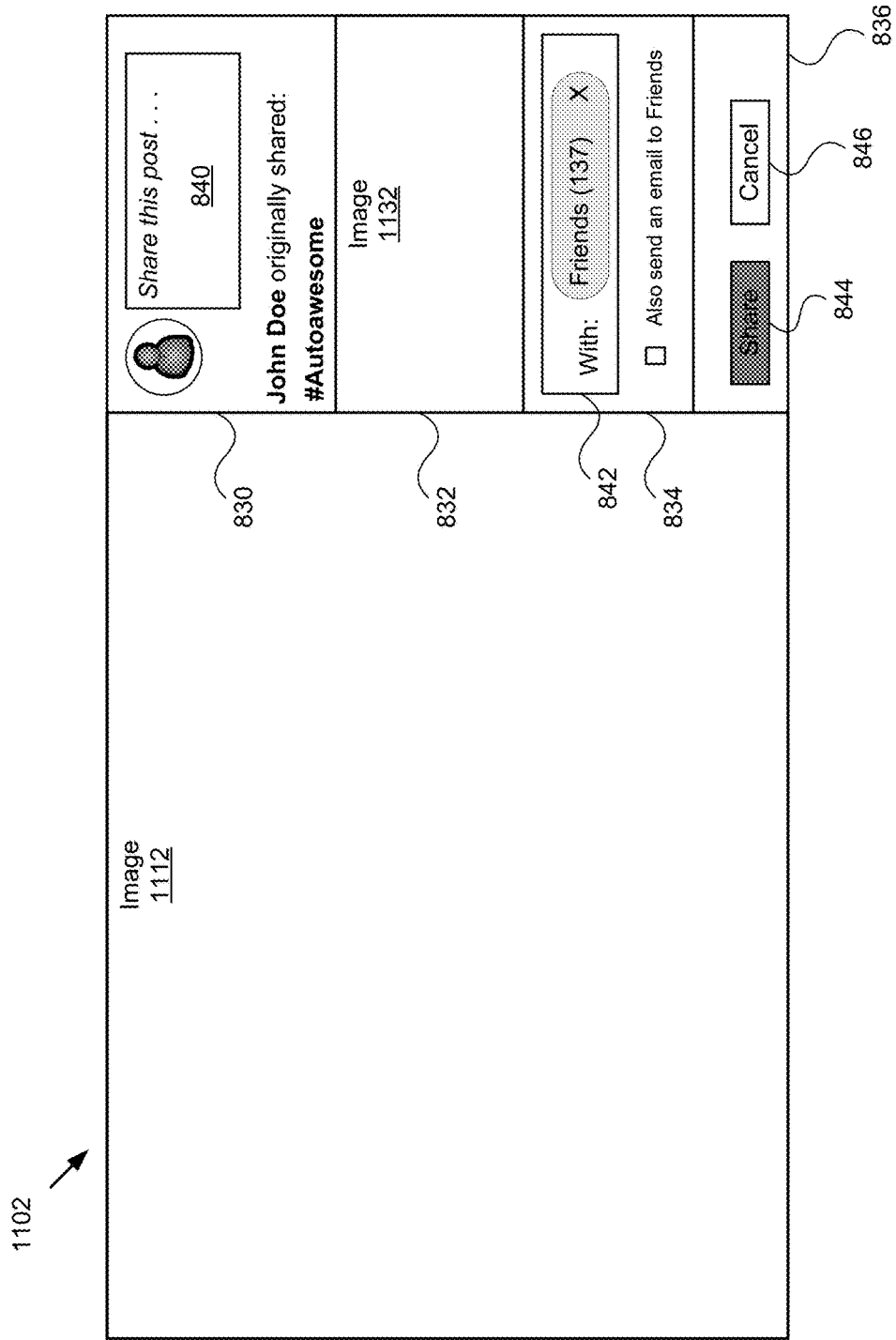
FIG. 11C is a graphic representation of an example inline resharing interface for the stream of content of FIG. 11A.

FIG. 11C is a graphic representation of an example inline resharing interface 1102 for a super post type tile 1110 that extends across the stream of content three tiles wide. In this example, the inline resharing interface 1102 is advantageously able to keep the original content the same size. In other words, the image 1112 of the example tile 1110 is the same size as the image 1112 of the inline resharing interface 1102. The inline resharing interface 1102 replaces the informational area 1114 of the example tile 1110 with the comment area 830, a reduced core content area 832 that presents image 1132, the addressee area 834 and the action area 836. It should be noted that image 1132 is the same image as image 1112 only reduced in size. In some implementations, rather than having image 1132 in the reduced core content area 832, the text from the informational malaria 1114 could be presented in the reduced core content area 832.

Systems and methods for generating and providing an inline resharing interface and sharing content have been described. While the present disclosure is described in the context of a social network, it should be understood that the terms "products" and "services" are used interchangeably throughout this specification and are used herein to encompass their plain and ordinary meaning including, but not limited to any online service, online product, online software that provides online endorsement services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   providing tiles of content for presentation in proximity to one another in a grid of rectangular card areas;
   receiving first input identifying a selected tile from the tiles of content;
   determining a portion of original content contained in the selected tile;
   transitioning from providing of the selected tile to generating an inline sharing interface corresponding to the selected tile and displaying a transition with visual effects, wherein the inline sharing interface is generated based on highlighting the portion of original content that is contained in the selected tile and adding an addressee area for receiving a recipient to which the portion of original content is to be shared;
   providing the inline sharing interface for presentation in place of the selected tile at approximately a same position in the grid as the selected tile and sized to match the selected tile while presentation of unselected tiles of content remain unchanged in positions and sizes; and responsive to the portion of original content contained in the selected tile having been shared with the recipient via the inline sharing interface, updating the selected tile with a visually distinct indication of the sharing of the portion of original content and providing the updated selected tile in place of the inline sharing interface at the same position and size of the selected tile.

2. The method of claim 1 wherein the inline sharing interface is sized within a threshold of a size of the selected tile.

3. The method of claim 1 wherein the inline sharing interface is positioned within a threshold of the position of the selected tile.

4. The method of claim 1 comprising:
receiving second input via the inline sharing interface; and
responsive to the second input being a share command, sending a message including the portion of original content and a comment.

5. The method of claim 1 comprising modifying a type of the visual effects by a pluggable component of the inline sharing interface.

6. The method of claim 1 comprising:
receiving second input via the addressee area of the inline sharing interface that affects a dimension of the inline sharing interface; and
resizing the inline sharing interface for the second input.

7. The method of claim 6 wherein resizing the inline sharing interface includes adjusting a size of one or more of the portion of original content from the selected tile, and the addressee area.

8. The method of claim 1 comprising:
receiving second input via the addressee area of the inline sharing interface that affects a dimension of the inline sharing interface; and
adjusting a scroll position of a view port showing the inline sharing interface.

9. The method of claim 1 wherein determining the portion of original content from the selected tile is based upon at least one factor from a group of factors including:
a size of the selected tile, a size of a display upon which the inline sharing interface is presented, a relationship of the selected tile to other posts, a content type, content quality, an author of the selected tile, an endorsement of the selected tile, a reshare of the selected tile, a fixed area of the inline sharing interface for the original content, a percentage of area of the inline sharing interface for the original content, a minimum area of the inline sharing interface for the original content, and a maximum area of the inline sharing interface for the original content.

10. A computer program product comprising a non-transitory computer usable medium including a computer readable program, wherein the computer readable program when executed on a computer causes the computer to perform:
providing tiles of content for presentation in proximity to one another in a grid of rectangular card areas;
receiving first input identifying a selected tile from the tiles of content;
transitioning from providing of the selected tile to generating an inline sharing interface corresponding to the selected tile and displaying a transition with visual effects, wherein the inline sharing interface is generated based on highlighting a portion of original content that is contained in the selected tile and adding an addressee area for receiving a recipient to which the portion of original content is to be shared;
providing the inline sharing interface for presentation in place of the selected tile at approximately a same position in the grid as the selected tile and sized to match the selected tile while presentation of unselected tiles of content remain unchanged in positions and sizes; and
responsive to the portion of original content contained in the selected tile having been shared with the recipient via the inline sharing interface, updating the selected tile with a visually distinct indication of the sharing of the portion of original content and providing the updated selected tile in place of the inline sharing interface at the same position and size of the selected tile.

11. The computer program product of claim 10 wherein the inline sharing interface is sized within a threshold of a size of the selected tile.

12. The computer program product of claim 10 wherein the inline sharing interface is positioned within a threshold of the position of the selected tile.

13. The computer program product of claim 10 wherein the computer readable program when executed on the computer also causes the computer to perform:
receiving second input via the inline sharing interface; and
responsive to the second input being a share command, sending a message including the portion of original content and a comment.

14. The computer program product of claim 10 wherein the computer readable program when executed on the computer also causes the computer to perform:
modifying a type of the visual effects by a pluggable component of the inline sharing interface.

15. The computer program product of claim 10 wherein the computer readable program when executed on the computer also causes the computer to perform:
receiving second input via the addressee area of the inline sharing interface that affects a dimension of the inline sharing interface; and
resizing the inline sharing interface for the second input.

16. The computer program product of claim 15 wherein resizing the inline sharing interface includes adjusting a size of one or more of the portion of original content from the selected tile, and the addressee area.

17. The computer program product of claim 10 wherein the computer readable program when executed on the computer also causes the computer to perform:
receiving second input via the addressee area of the inline sharing interface that affects a dimension of the inline sharing interface; and
adjusting a scroll position of a view port showing the inline sharing interface.

18. The computer program product of claim 10 wherein the computer readable program when executed on the computer also causes the computer to perform determining the portion of original content from the selected tile, and wherein the determining is based upon at least one factor from a group of factors including:
a size of the selected tile, a size of a display upon which the inline sharing interface is presented, a relationship of the selected tile to other posts, a content type, content quality, an author of the selected tile, an endorsement of the selected tile, a reshare of the selected tile, a fixed area of the inline sharing interface for the original content, a percentage of area of the inline sharing interface for the original content, a minimum area of the inline sharing interface for the original content, and a maximum area of the inline sharing interface for the original content.

19. A system comprising:
a processor, and;
a memory storing instructions that, when executed, cause the system to:
provide tiles of content for presentation in a grid of rectangular card areas;
receive first input identifying a selected tile from the tiles of content;
transition from providing of the selected tile to generating an inline sharing interface corresponding to the selected tile and display a transition with visual effects, wherein the inline sharing interface is generated based on highlighting a portion of original content that is contained in the selected tile and adding an addressee area for receiving a recipient to which the portion of original content is to be shared;
provide the inline sharing interface for presentation in place of the selected tile at approximately a same position in the grid as the selected tile and sized to match the selected tile while presentation of unselected tiles of content remain unchanged in positions and sizes; and
responsive to the portion of original content contained in the selected tile having been shared with the recipient via the inline sharing interface, update the selected tile with a visually distinct indication of the sharing of the portion of original content and provide the updated selected tile in place of the inline sharing interface at the same position and size of the selected tile.

20. The system of claim 19 wherein the inline sharing interface is sized within a threshold of a size of the selected tile.

21. The system of claim 19 wherein the inline sharing interface is positioned within a threshold of the position of the selected tile.

22. The system of claim 19 wherein the memory also stores instructions that, when executed, cause the system to:
receive second input via the inline sharing interface; and
responsive to the second input being a share command, send a message including the portion of original content and a comment.

23. The system of claim 19 wherein the memory also stores instructions that, when executed, cause the system to:
modify a type of the visual effects by a pluggable component of the inline sharing interface.

24. The system of claim 22 wherein the memory also stores instructions that, when executed, cause the system to:
receive second input via the inline sharing interface that affects a dimension of the inline sharing interface; and
resize the inline sharing interface for the second input.

25. The system of claim 24 wherein resizing the inline sharing interface includes adjusting a size of one or more of the portion of original content from the selected tile, and the addressee area.

26. The system of claim 19 wherein the memory also stores instructions that, when executed, cause the system to:
receive second input via the addressee area of the inline sharing interface that affects a dimension of the inline sharing interface; and
adjust a scroll position of a view port showing the inline sharing interface.

27. The system of claim 19 wherein the memory also stores instructions that, when executed, cause the system to determine the portion of original content from the selected tile, and wherein the determining is based upon at least one factor from a group of factors including:
a size of the selected tile, a size of a display upon which the inline sharing interface is presented, a relationship of the selected tile to other posts, a content type, content quality, an author of the selected tile, an endorsement of the selected tile, a reshare of the selected tile, a fixed area of the inline sharing interface for the original content, a percentage of area of the inline sharing interface for the original content, a minimum area of the inline sharing interface for the original content, and a maximum area of the inline sharing interface for the original content.

28. A method comprising:
providing a tile of content for presentation in proximity to one another in a grid of rectangular card areas;
receiving first input to share a selected tile of content;
determining a portion of content contained in the selected tile;
updating an interface corresponding to presentation of the selected tile to provide inline sharing at approximately a same position in the grid as the selected tile and sized to match the selected tile while presentation of unselected tiles of content remain unchanged in positions and sizes, wherein updating the interface includes transitioning the selected tile to the interface that highlights the portion of content and includes the highlighted portion and an addressee area for receiving a recipient to which the portion of content is to be shared; and
responsive to the portion of content contained in the selected tile having been shared with the recipient via the interface, updating the selected tile with a visually distinct indication of the sharing of the portion of content and providing the updated selected tile in place of the interface at the same position and size of the selected tile.

29. The method of claim 28 wherein the updated interface for inline sharing maintains a location of the selected tile within a threshold.

30. The method of claim 28 wherein the updated interface for inline sharing maintains a size of the selected tile within a threshold.

31. The method of claim 28 comprising:
receiving second input via the updated interface; and
responsive to the second input being a share command, sending a message including the portion of content and a comment.

32. The method of claim 28 wherein transitioning the selected tile to the interface includes displaying a transition with visual effects, and modifying a type of the visual effects by a pluggable component of the interface.

33. The method of claim 28 comprising:
receiving second input via the addressee area of the updated interface that affects a dimension of the updated interface; and
resizing the updated interface for the second input.

34. The method of claim 33 wherein resizing the updated interface includes adjusting a size of one or more of the portion of content from the selected tile and the addressee area.

35. The method of claim 28 comprising:

receiving second input via the addressee area of the updated interface that affects a dimension of the updated interface; and adjusting a scroll position of a view port showing the updated interface.

36. The method of claim 28 wherein determining the portion of content in the selected tile is based upon at least one factor from a group of factors including:

a size of the selected tile, a size of a display upon which the updated interface is presented, a relationship of the selected tile to other posts, a content type, content quality, an author of the selected tile, an endorsement of the selected tile, a reshare of the selected tile, a fixed area of the updated interface for the original content, a percentage of area of the updated interface for the original content, a minimum area of the updated interface for the original content, and a maximum area of the updated interface for the original content.

\* \* \* \* \*